(12) United States Patent
Bartlett

(10) Patent No.: US 7,932,860 B2
(45) Date of Patent: Apr. 26, 2011

(54) DETERMINING A POSITION OF A TAG

(75) Inventor: David Bartlett, Cambridgeshire (GB)

(73) Assignee: Omnisense, Ltd., Cambridge (GB)

( * ) Notice: Subject to any disclaimer, the term of this patent is extended or adjusted under 35 U.S.C. 154(b) by 0 days.

(21) Appl. No.: 12/459,733

(22) Filed: Jul. 7, 2009

(65) Prior Publication Data

US 2010/0013711 A1    Jan. 21, 2010

Related U.S. Application Data

(63) Continuation of application No. PCT/GB2007/050792, filed on Dec. 31, 2007.

(30) Foreign Application Priority Data

Jan. 8, 2007    (GB) .................................. 0700273.6

(51) Int. Cl.
*G01S 5/04* (2006.01)
(52) U.S. Cl. ...................................................... 342/442
(58) Field of Classification Search ................... 342/442
See application file for complete search history.

(56) References Cited

U.S. PATENT DOCUMENTS

| | | | |
|---|---|---|---|
| 2,148,267 A | 2/1939 | Honore | |
| 3,983,559 A | 9/1976 | Honore | |
| 5,045,861 A | 9/1991 | Duffett-Smith | |
| 5,596,330 A | 1/1997 | Yokev et al. | |
| 6,225,945 B1 | 5/2001 | Loomis | |
| 7,132,981 B1 | 11/2006 | Roberts | |
| 7,228,228 B2 | 6/2007 | Bartlett et al. | |
| 2004/0260506 A1 | 12/2004 | Jones et al. | |
| 2005/0129139 A1* | 6/2005 | Jones et al. | .................... 375/295 |

FOREIGN PATENT DOCUMENTS

| | | |
|---|---|---|
| AU | WO9723785 | 7/1997 |
| WO | WO9625673 | 8/1996 |
| WO | WO0059137 | 10/2000 |
| WO | WO0241029 | 5/2002 |

OTHER PUBLICATIONS

EPO Communication in Application No. 07 848 752.7-2220, Dec. 22, 2009.
Response to EPO Communication in Application No. 07 848 752.7, Jul. 1, 2010.

* cited by examiner

*Primary Examiner* — Thomas H Tarcza
*Assistant Examiner* — Harry Liu
(74) *Attorney, Agent, or Firm* — Kuta IP Law, LLC; Christina M. Kuta

(57) ABSTRACT

A tag transmits signals having at least two different frequency components. The signals are receivable by at least some of a plurality of spaced receivers. Each receiver, in response to receiving a signal, measures respective phases of the first and second frequency components and a frequency offset between the tag and the receiver. The frequency offset is dependent upon a difference in frequencies of respective clocks in the tag and the receiver. A position processor obtains a difference in phases of the first and second frequency components for a signal, a frequency offset between the receiver and tag and determines the position of the tag in dependence upon the difference between respective phases of the first and second frequency components and in dependence upon the frequency offset.

35 Claims, 21 Drawing Sheets

DETERMINING A POSITION OF A TAG

CROSS-REFERENCES

This application is a continuation of PCT Application No. PCT/GB2007/050792, titled "Determining a Position of a Tag" and filed on Dec. 31, 2007 and having a priority date of Jan. 8, 2007.

FIELD OF THE INVENTION

The present invention relates to apparatus for and a method of determining a position of a tag.

BACKGROUND

Location systems have been widely used for navigation at sea, in the air and on land. Satellite positioning systems, such as Global Positioning System (GPS), are becoming increasingly popular for navigation and route guidance. Furthermore, these systems are being used to support context-related services. Accurate position information can be used in sport to provide value to spectators, athletes and trainers. However, satellite positioning systems, such as GPS, are not ideally suited to such applications, for several reasons.

Firstly, information about position is usually provided at the receiver. However, in context-dependent applications, positional information is usually needed remotely. Furthermore, receivers require good satellite coverage. However, sporting events often take part indoors or in areas without good satellite coverage. Satellite positioning systems are usually accurate to a few meters and can take several seconds or even minutes to determine a position. However, context-dependent applications often require higher accuracy (e.g. to within a few centimeters) and for positions to be available in real-time (e.g. within milliseconds). Lastly, satellite positioning systems provide information about an absolute geographic position. However, in context-dependent applications, the relative positions of objects is often more important. Systems tailored to these specialist applications have been developed. For example, some systems have been optimised for ball tracking. Other systems have been adapted for accurately measuring relative positions of athletes' limbs during training. Others systems have been developed for accurately measuring the time at which the object crosses a line. Many systems operate across a limited area, for example hundreds of meters to a few kilometers, for the purpose of continuously tracking sports players and objects in real-time during events. These systems are generally based on radio location technologies in which the system tracks small electronic tags carried by the target objects or on imaging technologies that use multiple images from cameras to estimate the object's position.

Accurate position information can also be used in asset monitoring and tracking for commercial or business use, such as in manufacturing, mining, farming, retail, event management and others. Many of the positioning systems based on radio location or imaging technologies are well suited to these applications, often working better than satellite navigation systems for reasons similar to those given earlier. WO-A-03016940 describes a system in which a mobile tag transmits a signal, including a pair of tones, to receivers having known positions. The phase difference between the pair of tones received at each receiver is calculated and used as the basis for determining the position of the tag. This system has the advantage that the effective wavelength of the phase measurement is determined by the frequency difference between the pair of tones, but the signal and tones may be transmitted in a convenient radio band. The actual radio band used for transmission is largely unimportant and the relationship between the tones is not affected significantly by radio architectures or system configuration. The system solves many of the problems affecting earlier phase measuring systems, such as the system described in U.S. Pat. No. 5,045,861. However, the system, like many other phase measuring systems, suffers from the problem of multipath. Multipath is difficult to detect and mitigate since the sum of two phase-shifted tones is simply a tone with a different phase.

The present invention seeks to provide apparatus for and a method of determining a position of a tag.

SUMMARY

According to a first aspect of the present invention there is provided a method comprising receiving a phase difference between phases of two frequency components of a first signal transmitted by a tag at a first time and measured by a receiver, receiving a frequency offset between the tag and the receiver for the first signal, receiving a phase difference between phases of two frequency components of a second signal transmitted by the tag at a second, different time and measured by a receiver and determining the position of the tag in dependence upon the phase differences and the frequency offset.

Using a frequency offset yields additional information which can be used to improve performance, for example, by increasing accuracy and/or by increasing speed since the fewer measurements can be used. Also, the additional information may be used to identify and compensate for multipath effects. The method may further comprise receiving a frequency offset between the tag and the receiver for the second signal.

The method may comprise receiving at least three phase differences for each of at least two signals transmitted by the tag, each signal comprising at least two frequency components and each of the at least three phase differences corresponding to phases measured by a different receiver, receiving at least three frequency offsets for each of the at least two signals, each of the at least frequency offsets measured by a different receiver and determining at least one position of the tag in dependence upon the phase differences and the frequency offsets. The method may comprise determining each of the positions at which the tag transmitted the signals. The at least two signals form a sequence of signals, optionally consecutive signals, within a larger sequence of signals. The first and second signals may be received by the same receiver. Each frequency offset may be dependent upon a difference in frequencies of clocks in the tag and the receiver and upon a velocity of the tag at time of transmission of the signal.

The method may further comprise receiving the phases of the two frequency components, calculating the phase difference and providing the phase difference.

The method may further comprise, at each receiver, for each signal received, measuring the phases of two frequency components and outputting the phases of the two frequency components. The method may further comprise, at each receiver, for each signal received measuring a frequency offset and outputting a frequency offset. Measuring the frequency offset may comprise receiving a signal, processing the signal to provide a processed signal, Fourier transforming the processed signal to obtain time-varying phase values, measuring a gradient of the time-varying phase values and outputting the gradient as the frequency offset. The method may comprise providing a range equation dependent upon the phase difference. The range equation may also be dependent upon a phase offset between the clocks in the tag and the receiver. The range equation may be dependent upon a frequency offset between respective clocks in the tag and the receiver. The range equation may include an error term and the equation may be set to equal zero.

The method may comprise providing a velocity equation dependent upon the frequency offsets. The velocity equation may be dependent upon a frequency difference between respective clocks in the tag and the receiver. The velocity equation may include an error term and the equation may be set to equal zero.

The method may comprise determining a velocity of the tag in dependence upon the phase difference and the frequency offsets. The method may comprise receiving a plurality of phase differences between phases of two frequency components of a plurality of signals transmitted by the tag and measured by a plurality of receivers, receiving a plurality of frequency offsets for the plurality of signals transmitted by the tag and measured by a plurality of receivers, determining a plurality of positions of the tag in dependence upon the phase differences and the frequency offsets.

The method may comprise preparing a first set of equations for at least one signal and a plurality of receivers, each equation being a function of position of the tag and a respective phase difference and including a respective residual error, preparing a second set of equations for at least two signals and a plurality of receivers, each equation being a function of position of the tag and a respective pair of frequency offsets and including a respective residual error and solving the equations to obtain at least one position of the tag.

Thus, the number of equations can be varied depending on desired performance and/or the number of measurements. Solving the equations to obtain at least one position of the tag may include combining the equations to provide a cost function and minimising cost function. A cost function can be used as an indication of reliability of a position estimate. Thus, if the cost is high, indicating that the estimate is unreliable, then the estimate can be ignored or measures taken to compensate, for example, by discarding equations corresponding to erroneous measurements.

Combining the equations may include providing a respective weighting for each equation. Thus, equations can be weighted according to how good or bad a measurement is considered to be. There may be 5, 6 or 7 signals or at least 8 signals. Using more signals can help to improve performance. There may be at least four receivers. The method may comprise determining the number of equations, determining the number of unknowns in the equations and preparing further equations until the number of equations is equal to or greater than the number of unknowns. The method may comprise preparing further equations until the number of equations exceeds the number of unknowns. The method may comprise determining the number of equations needed in dependence upon the number of receivers and the number of signals measured by the receivers.

The tag may transmit signals at least two different frequency components at different times. The tag may transmit signals having at least four different frequency components. Using more frequency components can help to improve performance. The method may comprise receiving a difference in respective phases of two different frequency components for a given signal from a fixed tag of known position and measured at receiver, receiving frequency offsets for the signals and determining a phase offset between respective clocks in the tag and the receiver. Using a fixed tag can help to compensate for the clock offsets and, thus, pseudosynchronise receivers and tag.

The method may comprise determining a phase offset between respective clocks in the tag and the receiver for a specific time using the phase offset and correcting the phase difference between respective phases of the first and second frequency components for the phase offset.

The method may comprise receiving a difference in respective phases of two different frequency components for a given signal from a first fixed tag of known position and for a first receiver, receiving a difference in respective phases of two different frequency components for a given signal from a second fixed tag of known position and for a second receiver and determining a relative phase offset between the first and second receivers. The method may comprise receiving frequency offsets between a first fixed tag and a first receiver for at least two different signals, receiving frequency offsets between a second fixed tag and a second receiver for at least two different signals and determining a relative frequency offset between the first and second receivers. The tag may transmit signals at least four different frequency components, such that at least two different phase differences are obtainable corresponding to different pairs of frequency components and the method may comprise determining a first estimate of position of the tag in dependence upon the difference between respective phases of a first pair of frequency components and determining a second estimate of position of the tag in dependence upon the difference between respective phases of a second pair of frequency components.

Determining the position of the tag may include limiting the position of the tag to a predefined surface, such as a plane.

According to a second aspect of the present invention there is provided a method comprising receiving a phase difference between phases of two frequency components of a first signal transmitted by a transmitter at a first time and measured by a tag, receiving a frequency offset between the tag and the receiver for the first signal, receiving a phase difference between phases of two frequency components of a second signal transmitted by a transmitter at a second, different time and measured by a tag and determining the position of the tag in dependence upon the phase differences and the frequency offsets.

Using frequency offsets yields additional information which can be used to improve performance, for example, by increasing accuracy and/or by increasing speed since the fewer measurements can be used. Also, the additional information may be used to identify and compensate for multipath effects.

The method may comprise receiving a phase difference for each signal of at least three sets of signals, each signal comprising at least two frequency components, each set of signals transmitted by a different receiver and each set comprising at least two signals, receiving frequency offset for each signal of the at least three sets of signals and determining at least one position of the tag in dependence upon the phase differences and the frequency offsets. According to a third aspect of the present invention there is provided a computer program comprising instructions which, when executed by a computer, causes the computer to perform the method.

According to a fourth aspect of the present invention there is provided a computer readable medium storing the computer program.

According to a fifth aspect of the present invention there is provided apparatus comprising means for receiving a phase difference between phases of two frequency components of a first signal transmitted by a tag at a first time and measured by a 5 receiver, means for receiving a frequency offset between the tag and the receiver for the first signal, means for receiving a phase difference between phases of two frequency components of a second signal transmitted by the tag at a second, different time and measured by a receiver and means for determining the position of the tag in dependence upon the phase differences and the frequency offsets.

The phase difference receiving means may be operable to receive at least three phase differences for each of at least two signals transmitted by the tag, each signal comprising at least two frequency components and each of the at least three phase differences corresponding to phases measured by a different receiver, the frequency offset receiving means may be operable to receive at least three frequency offsets for each of the at least two signals, each of the at least frequency offsets measured by a different receiver and the position determining means may be operable to determine at least one position of the tag in dependence upon the phase differences and the frequency offsets.

According to a sixth aspect of the present invention there is provided apparatus comprising a buffer arranged to receive a phase difference between phases of two frequency components of a first signal transmitted by a tag at a first time and measured by a receiver, a frequency offset between the tag and the receiver for the first signal, a phase difference between phases of two frequency components of a second signal transmitted by the tag at a second, different time and measured by a receiver and a position determination unit to determine the position of the tag in dependence upon the phase difference and the frequency offsets. According to a seventh aspect of the present invention there is provided a system comprising the apparatus and at least three receivers, each receiver operable, in response to receiving a signal, to measure respective phases of the first and second frequency components and to measure a frequency offset between the tag and the receiver, the frequency offset dependent upon a difference in frequencies of respective clocks in the tag and the receiver and to transmit the phases and the frequency offset to the tag position determining apparatus.

Embodiments of the present invention will now be described, by way of example, with reference to the accompanying drawings in which:

DRAWINGS

DESCRIPTION

Figure 1:
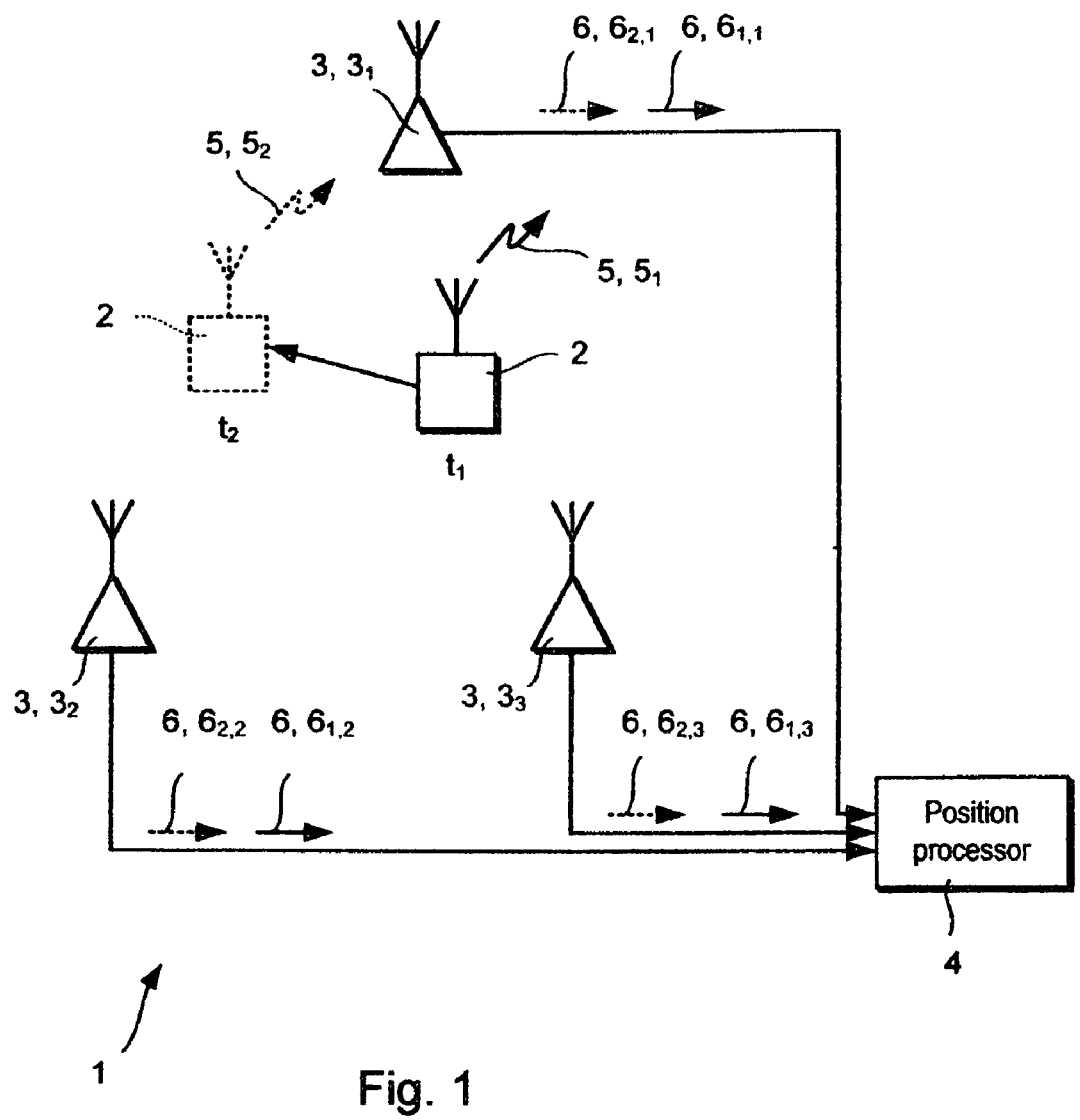
FIG. 1 is a schematic diagram of a system for determining a position of a tag according to some embodiments of the present invention in which chirps are transmitted by a tag and received by receivers.

Referring to FIG. 1, a system 1 for determining position and velocity of a mobile tag 2 (hereinafter referred to simply as a "tag") in accordance with embodiments of the present invention is shown. The tag 2 is attached to a subject (not shown), such as jockey or horse, to be tracked.

The system 1 includes receivers 3 including first, second and third fixed receivers $3_1$, $3_2$, $3_3$ and a position processor 4. The tag 2 periodically transmits signals 5. Each time a receiver 3 receives a signal 5, it processes the signal 5 and transmits a message 6 to the position processor 3. The position processor 4 calculates a position and a velocity of the mobile tag 2 using one or more sets of messages 6.

For example, at time $t_1$, the tag 2 transmits a first signal $5_1$ which is received by receivers $3_1$, $3_2$, $3_3$. Each receiver $3_1$, $3_2$, $3_3$ processes the signal 5, and transmits a first message $6_{1,1}$, $6_{1,2}$, $6_{1,3}$ to the position processor 4. At time $t_2$ (where $t_1 \neq t_2$), the tag 2 transmits a second signal $5_2$ which is received by the receivers $3_1$, $3_2$, $3_3$. Each receiver $3_1$, $3_2$, $3_3$ process the signal $5_2$ and transmits a second message $6_{2,1}$, $6_{2,2}$, $6_{2,3}$ to the position processor 4.

The tag 2 transmits each signal 5 at two different frequencies (referred to herein as "tones") which enables the position processor 4 to determine an absolute position and velocity over a large (e.g. >1 km$^2$) operating area while maintaining accuracy (e.g. <1 m). The processor 4 calculates the positions for the tag 2 at times $t_1$ and $t_2$ simultaneously using velocity components to constrain relative positions.

The distance or "range" separating the tag 2 and the receiver 3 can be found using the time it takes the signal 5 to propagate between the tag 2 and the receiver 3. The range can also be found by measuring the phase difference $\Theta_{Ri}$ between different frequency components of the signal 5 received at the receiver 3, as described in WO-A-0241029, which is incorporated herein by reference.

The system 1, in addition to measuring range, also measures a frequency error $v_i$ of the signal 5. The error arises due to frequency offsets between the clocks 12 (FIG. 4), 30 (FIG. 5) in the tag 2 and receivers 3 and due to a frequency shift caused by the Doppler effect resulting from the tag 2 moving relative to the receivers 3. A Doppler frequency yields a velocity in the direction linking tag 2 and the receiver 3. Thus, the system 1 can compute the velocity of the tag 2, given two or more velocity vectors (having orthogonal components) and the position of the tag 2.

The system 1 calculates the position and velocity of the tag 2 using phase and frequency offsets so as to compensate for multipath effects.

Figure 2:
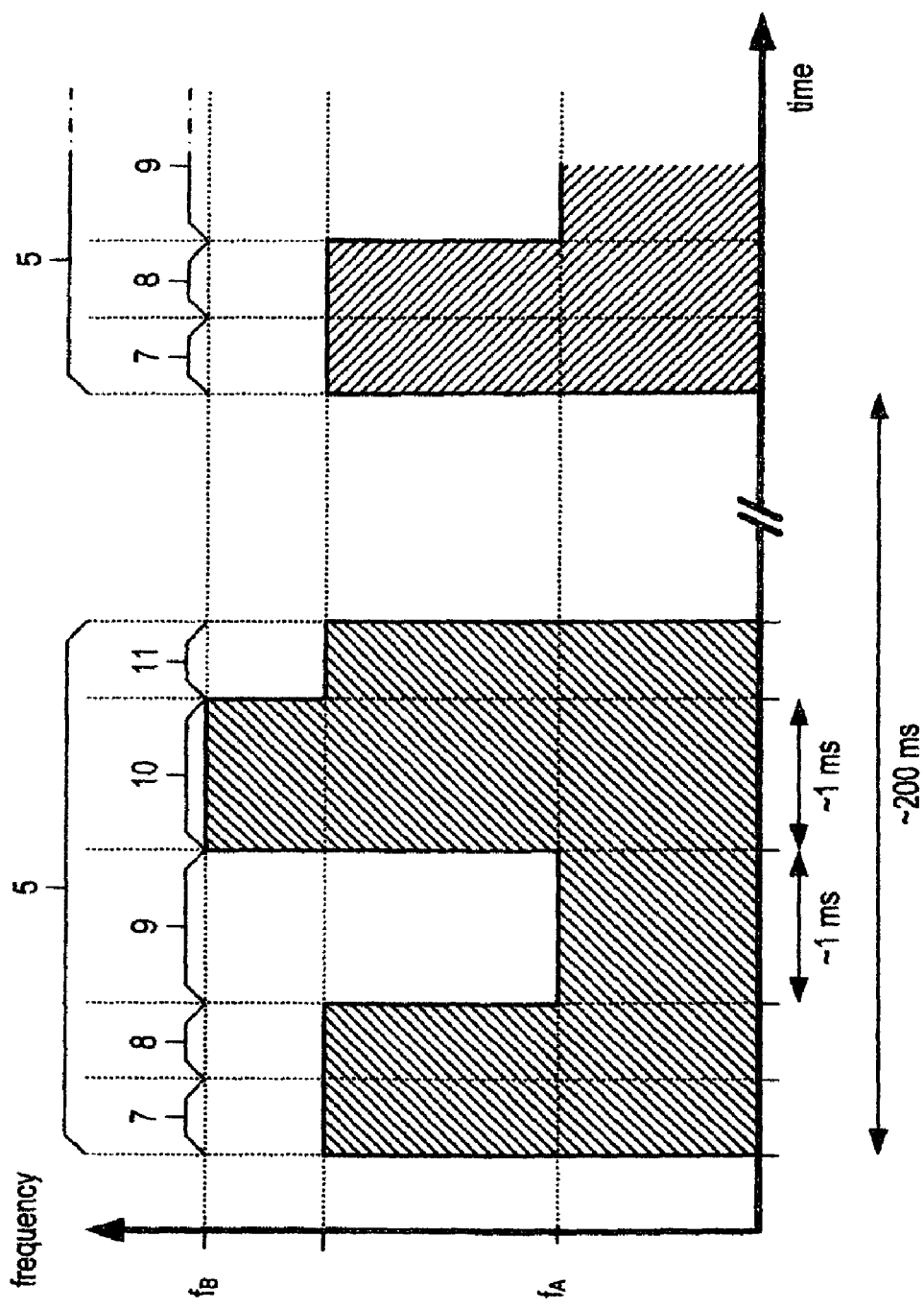
FIG. 2 illustrates a first chirp structure.

Referring also to FIG. 2, the structure of the transmitted signal 5 is shown.

The tag 2 operates as a short-range, low-power radio transmitter in a 2.45 GHz licence-exempt band.

The tag 2 repeatedly transmits the signal 5 (herein also referred to as a "chirp") about 5 times per second. Each chirp 5 includes a preamble 7 to allow the transmitter circuitry (shown in FIG. 4) to start up and stabilise, followed by a tag identification tone 8, first and second positioning tones 9, 10 at frequencies $f_A$ and $f_B$ respectively, and a postamble 11. Herein, the term "tone" is used to refer to a positioning tone, unless stated otherwise.

The tones 9, 10 are separated (i.e. $f_A-f_B$) by 1.015625 MHz apart (i.e. approximately 300 m wavelength) and each has a duration of approximately 1 ms. The tones 9, 10 are transmitted sequentially.

Underlying Principles of Calculating Position and Velocity

Before describing specific methods of calculating position and velocity of the tag 2, some of the underlying principles employed by the system 1 will now be explained.

-Calculating Position-

Referring still to FIGS. 1 & 2, a phase difference $\Theta_{Ri}$ can be calculated for an i-th receiver 3 from the values of the frequencies $f_A$, $f_B$ measured at the i-th receiver 3 for the pair of tones 9, 10. This eliminates phase shifts and errors introduced by the transmitter, i.e. the tag 2, and by the receiver 3 and which effect both tones 9, 10. This is known as the "common mode effect". Common mode effects can be eliminated so that only unknown clock offsets and the phase change introduced by the range over which the signal propagates remain. An example of how common mode effects can be eliminated is described in WO-A-03016940.

A phase offset $\Phi_T$ between the clock 12 (FIG. 4) in the tag 2 and the clocks 30 (FIG. 5) in the receivers 3 (assuming they are all synchronised) is unknown and is referred to as the "network phase".

The measured phase difference $\Theta_{Ri}$ depends on the (unknown) network phase $\Phi_T$, the (unknown) position (x, y) of the tag 2 and the (known) position $(X_i, Y_i)$ of the i-the receiver 3, according to a basic range equation, namely:

$$\Theta_{Ri} = \Phi_T + (N_1 - N_2)\frac{\omega}{2\pi \cdot c}\sqrt{(x-X_i)^2 + (y-Y_i)^2} \quad (A)$$

where $N_1$ and $N_2$ are (known) multiplier ratios for the two tones 9, 10 and $\omega$ is a (known) FFT frequency bin spacing arising from sampling and transforming the tones 9, 10. In this example and the examples hereinafter described, $N_1-N_2=20$ and $\omega=50.78125$ kHz.

Because phase is measured in the range $+\pi$ to $-\pi$, the measured phase difference $\Theta_{Ri}$ comprises two parts, namely:

$$\Theta_{Ri} = C_i \cdot 2\pi + \Theta_i \quad (B)$$

where $C_i \cdot 2\pi$ represents a whole number of cycles and $\Theta_i$ is a fraction of a cycle which is measured. The component corresponding to the number of cycles can be determined using heuristic methods and a knowledge of the approximate location of the tag 2 which can be obtained, for example, by measuring the power of the chirp 5.

If three receivers 3 each receive a chirp 5 transmitted by the tag 2 (e.g. transmitted at $t_1$), then a set of three simultaneous equations can be defined, each equation based on equation (A) above and each having three unknowns (i.e. x, y and $\Phi_T$). The simultaneous equations can then be solved using the three different phase differences $\Theta_{Ri}$ obtained from measurements at receivers 3 to find the position of the tag 2, namely (x, y).

-Calculating Velocity-

Each measurement also includes a frequency offset, $v_i$, comprising a "network" frequency offset, V, between the clock 12 (FIG. 4) in the tag 2 and a "network clock" representing the clocks 30 (FIG. 5) in the receivers 3 (assuming they are all synchronised) and a frequency offset arising from the Doppler effect. If the position of the tag 2 is known, then the network frequency offset, V, and the velocity, v, of the tag 2 can be found.

Figure 3:
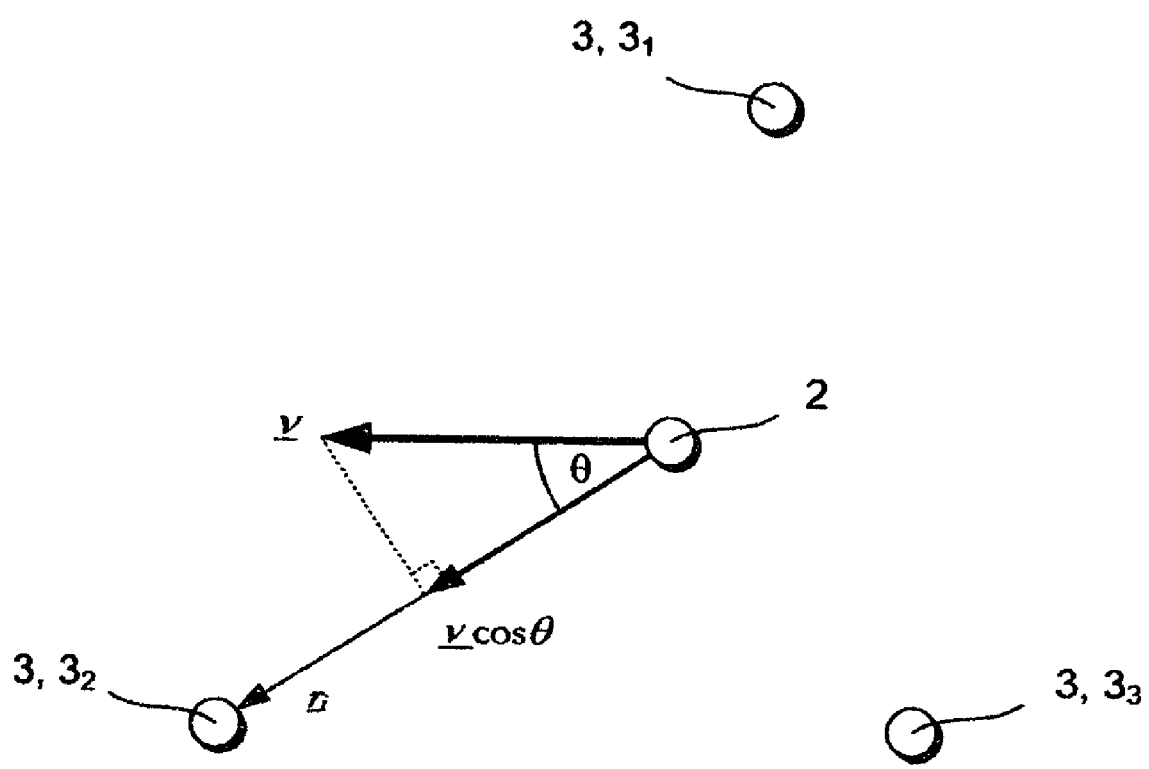
FIG. 3 illustrates position and velocity vectors for a tag.

Referring to FIG. 3, a range vector, $r_i$, links the tag 2 at (x, y) and an i-th receiver 3 at $(X_i, Y_i)$. The tag 2 moves at a velocity, v. The frequency offset arising from Doppler shift resulting from the tag 2 moving towards (or away from) the receiver 3 is given by the difference between the measured frequency offset, $v_i$, measured at an i-th receiver 3 and the network frequency offset, V, namely:

$$|v| \cdot \cos \theta = v_i - V \quad (C)$$

where $\theta$ is the angle between the range vector $r_i$ and the velocity v of the tag 2.

Multiplying both sides of equation (C) by $|r_i|$ yields:

$$|r_i| \cdot |v| \cdot \cos \theta = |r_i| \cdot (v_i - V) \quad (C')$$

and simplifying equation (C') yields:

$$r_i \cdot v = |r_i| \cdot (v_i - V) \quad (C'')$$

Expanding the vector dot product in (C'') yields:

$$r_{xi} \cdot v_x + r_{yi} \cdot v_y = |r_i| \cdot (v_i - V) \quad (D)$$

If the position of the tag 2 is known, then the range vectors $r_i$ can be found.

A set of three simultaneous equations can be defined, each equation based on equation (D) above and each having three unknowns (i.e. $v_x$, $v_y$ and V). The simultaneous equations can then be solved using the three different frequency offsets $v_i$ obtained from measurements at the receivers 3 so as to find the velocity of the tag 2, namely ($v_x$, $v_y$).

The network frequency offset, V, is referred to as the "network velocity" and is expressed in meters per second. The network velocity expressed in meters per second, V, can be converted into a network velocity expressed in radians per second (or Hz), $V_r$, using the following:

$$V = V_r \cdot \frac{\lambda}{2 \cdot \pi} \quad (E)$$

where $\lambda$ is a wavelength of a signal being measured. In this example and the examples hereinafter described, $\lambda=1.015625$ MHz (i.e. approximately 300 m wavelength). Hereinafter, the term "network velocity" is assumed to refer to the network velocity expressed in radians per second, $V_r$, unless stated otherwise.

-Calculating Position and Velocity-

As shown in FIG. 1, the tag 2 transmits a first chirp $5_1$ at time $t_1$ and a second chirp $5_2$ at time $t_2$ having moved a distance, d. The velocity v at which the tag 2 is moving can be expressed as:

$$v = \frac{d}{\Delta t} \quad (F)$$

where $\Delta t = t_1 - t_2$.

Assuming that the receivers 3 and the tag 2 have clocks that are stable over the time interval spacing the two measurements, the network velocity $V_r$ remains constant over the time interval and so respective network phases $\Phi_T(t)$ at times $t_1$ and $t_2$ are related as follows:

$$\Phi_T(t_2) = \Phi_T(t_2) + (t_2 - t_1) \cdot V_r \quad (G)$$

The velocity, $v = (v_x, v_y)$, of the tag 2 can be expressed as:

$$v_x = \frac{\Delta x}{\Delta t} \text{ and } v_y = \frac{\Delta y}{\Delta t} \quad (H)$$

where $\Delta x$, $\Delta y$ represent the change in position of the tag 2.

A range equation, $f_{j,i}(x_j, y_j, \Phi_T)$, can be constructed from equations (A) and (B) and generalized from a measured phase difference, $\Theta_{Ri}(j) = C_{j,i} \cdot 2\pi + \Theta_{j,i}$, at an i-th receiver 3 receiving a chirp 5 transmitted by the tag 2 at a j-th time:

$$f_{j,i}(x_j, y_j, \Phi_T) = (N_1 - N_2)\frac{\omega}{2\pi \cdot c} \cdot |r_{j,i}(x_j, y_j)| + \quad (I)$$
$$\Phi_T(t_0) + (t_j - t_0) \cdot V_r - C_{j,i} \cdot 2\pi - \Theta_{j,i}$$
$$= \varepsilon_{i,j,}$$

where $|r_{j,i}(x_j, y_j)| = \sqrt{(x_j - X_i)^2 + (y_j - Y_i)^2}$, such that $(x_j, y_j)$ are the co-ordinates of the tag 2 at the j-th time, and where $\Phi_T(t_0)$ is a network phase at time $t_0$. The time $t_0$ is typically chosen to be $t_1$ or $t_2$.

A velocity equation, $g_{j,k,i}(x_j, y_j, x_k, y_k, V_r)$, can be constructed from equation (D) and generalised for a pair of measured frequency offsets, $v_{j,i}$ and $v_{k,j}$, at an i-th receiver 3 receiving chirps 5 transmitted by the tag 2 at j-th and k-th times (where $j \neq k$):

$$g_{j,k,i}(x_j, y_j, x_k, y_k, V_r) = \left(\frac{r_{x,j,i}}{|r_{j,i}|} + \frac{r_{x,k,i}}{|r_{k,i}|}\right) \cdot \frac{(x_k - x_j)}{(t_k - t_j)} + \quad (J)$$
$$\left(\frac{r_{y,j,i}}{|r_{j,i}|} + \frac{r_{y,k,i}}{|r_{k,i}|}\right) \cdot \frac{(y_k - y_j)}{(t_k - t_j)} -$$
$$v_{j,i} - v_{k,i} - 2 \cdot V_r \cdot \frac{\lambda}{2\pi}$$
$$= \varepsilon_{i,j,k}$$

One or more range equations, $f_{j,i}(x_j, y_j, \Phi_T)$, and one or more velocity equations, $g_{j,k,i}(x_j, y_j, x_k, y_k, V_r)$, can be combined using weighting factors. The values of the weighting factors depend on the quality of measurements and system parameters. The sum of the squares of individual equations can be combined as follows:

$$P(x_j, y_j, x_k, y_k, \Phi_T, V_r) = f_{j,i}^2 + w_{j,k,i} g_{j,k,i}^2 \quad (K)$$

where $k \in (j)$, $k \neq j$.

Figure 8:
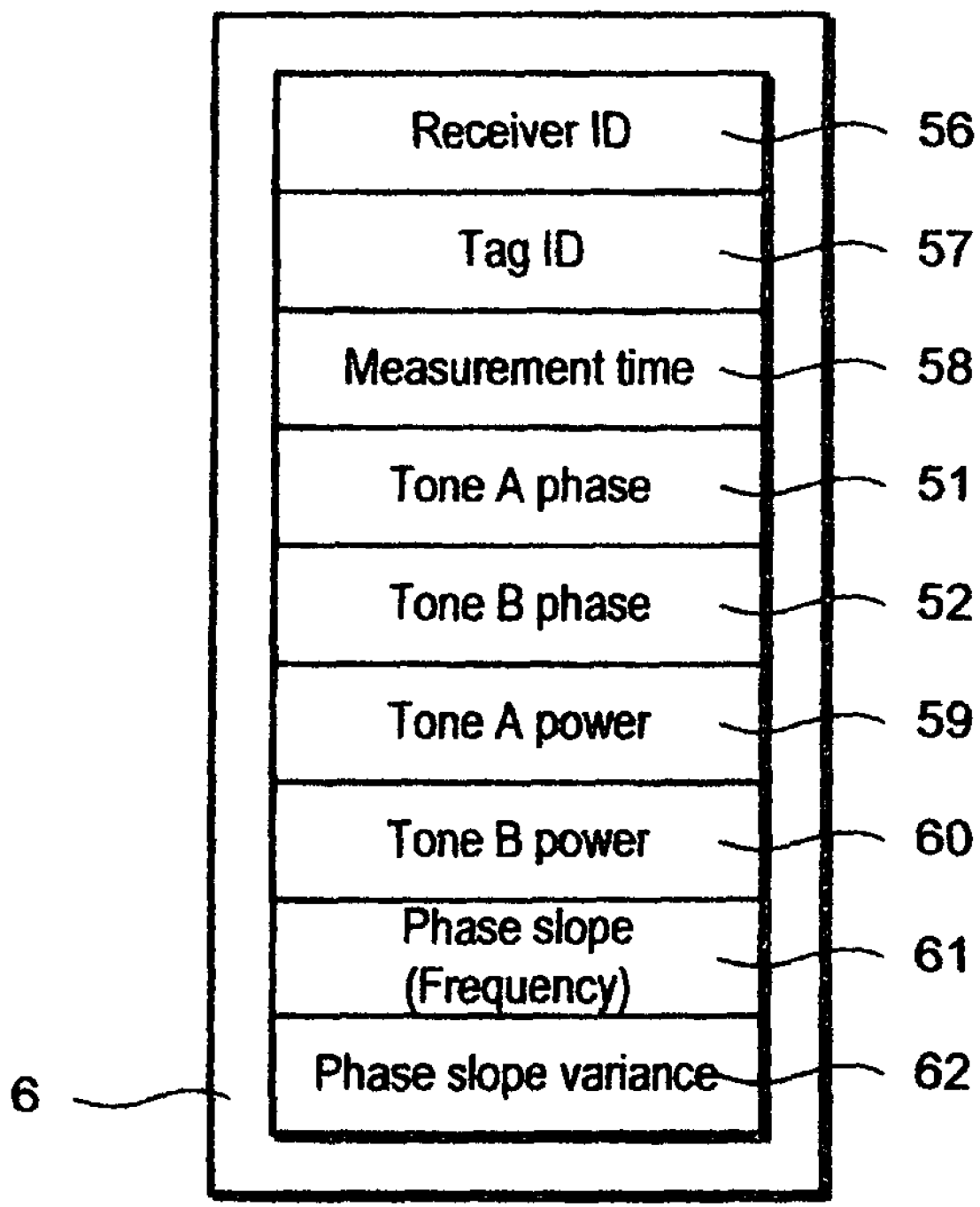
FIG. 8 is a schematic block diagram of a message transmitted by a receiver to a position processor.

In this example, each weighting $w_{j,k,i}$ has the same value. However, the weighting $w_{j,k,i}$ may vary with i, j, k. For example, if a measurement (i.e. for a given i, j, k) is noisy, then the weighting may be reduced. The weighting $w_{j,k,i}$ may depend on a value of phase slope variance ($\sigma^2$) 62 (FIG. 8).

The equations include at least four unknowns, namely the position of the tag 2 at $t_j$, namely $(x_j, y_j)$, the position of the tag at $t_k$, namely $(x_k, y_k)$, network phase $\Phi_T(t_0)$ and network velocity $V_r$.

If two chirps 5 are transmitted at times $t_1$ and $t_2$, then a set of four equations can be constructed for an i-th receiver 3:

$$f_{1,i}(x_1, y_1, \Phi_T) = (N_1 - N_2)\frac{\omega}{2\pi \cdot c} \cdot |r_{1,i}(x_1, y_1)| + \quad (I\text{-}1)$$
$$\Phi_T(t_0) + (t_1 - t_0) \cdot V_r - C_{1,i} \cdot 2\pi - \Theta_{1,i}$$

$$f_{2,i}(x_2, y_2, \Phi_T) = (N_1 - N_2)\frac{\omega}{2\pi \cdot c} \cdot |r_{2,i}(x_2, y_2)| + \quad (I\text{-}2)$$
$$\Phi_T(t_0) + (t_2 - t_0) \cdot V_r - C_{2,i} \cdot 2\pi - \Theta_{2,i}$$

$$g_{1,2,i}(x_1, y_1, x_2, y_2, V_R) = \quad (J\text{-}1)$$
$$\frac{r_{x,1,i}}{|r_{1,i}|} \cdot \frac{(x_2 - x_1)}{(t_2 - t_1)} + \frac{r_{y,1,i}}{|r_{1,i}|} \cdot \frac{(y_2 - y_1)}{(t_2 - t_1)} - \left(v_{1,i} - V_{1,i} \cdot \frac{\lambda}{2\pi}\right)$$

$$g_{2,1,i}(x_1, y_1, x_2, y_2, V_R) = \quad (J\text{-}2)$$
$$\frac{r_{x,2,i}}{|r_{2,i}|} \cdot \frac{(x_2 - x_1)}{(t_2 - t_1)} + \frac{r_{y,2,i}}{|r_{2,i}|} \cdot \frac{(y_2 - y_1)}{(t_2 - t_1)} - \left(v_{2,i} - V_{1,i} \cdot \frac{\lambda}{2\pi}\right)$$

where $(x_1, y_1)$ is the position of the tag at $t_1$, $(x_2, y_2)$ is the position of the tag at $t_2$, $r_{1,i}$ is the vector between the tag at time $t_1$ and the i-th receiver 3, $r_{2,i}$ is the vector between the tag 2 at time $t_2$ and the i-th receiver 3, $\Phi_T(t_0)$ is the network phase at time $t_0$, $V_r$ is the network velocity measured in radians per second, $C_i$ is the number of cycles, $\Theta_{1,i}$ is the measured phase difference between tones 9, 10 for the tag 2 at time $t_1$ measured at the i-th receiver $3_i$, $\Theta_{2,i}$ is the measured phase difference between tones 9, 10 for the tag 2 at time $t_2$ measured at the i-th receiver 3, $v_{1,i}$ is the measured frequency offset for the tag 2 at time $t_1$ at the i-th receiver 3 and $v_{2,i}$ is the measured frequency offset for the tag 2 at time $t_1$ at the i-th receiver 3.

The equations (I-1), (I-2), (J-1) and (J-2) include four unknowns, namely the position of the tag 2 at $t_1$, i.e. $(x_1, y_1)$, the position of the tag at $t_2$, i.e $(x_2, y_2)$, network phase $\Phi_T(t^0)$ and network velocity $V_r$.

The velocity equations (J-1) and (J-2) include one forward-looking equation in which j=1 and k=2, and one backward-looking equation in which j=2 and k=1.

Each equation (I-1), (I-2), (J-1) and (J-2) can be set to zero, namely:

$$f_{1,i}(x_1, y_1, \Phi_T) = 0$$

$$f_{2,i}(x_2, y_2, \Phi_T) = 0$$

$$g_{1,2,i}(x_1, y_1, x_2, y_2, V_r) = 0$$

$$g_{2,1,i}(x_1, y_1, x_2, y_2, V_r) = 0$$

To obtain values of position, the combined function for each i-th receiver 3 is minimised, namely:

$$P(x_1, y_1, x_2, y_2, \Phi_T, V_r) = f_{1,i}^2 + f_{2,i}^2 + w_{1,2,i} g_{1,2,i}^2 + w_{2,1,i} g_{2,1,i}^2$$

If three receivers 3 receive each chirp 5, then a set of twelve equations can be constructed. The aim is to minimise a combined function based on 12 equations and, thus, find values for the four unknowns, namely the position of the tag 2 at $t_1$, namely $(x_1, y_1)$, the position of the tag at $t_2$, namely $(x_2, y_2)$, network phase $\Phi_T(t_0)$ at time $t_0$ and network velocity $V_r$.

Herein, the system 1 treats time as a discrete variable. Thus, equations herein express time as a discrete variable. However, the system 1 may treat time as a continuous variable.

Embodiments of a tag 2 and a receiver 3 for use in the system 1 shown in FIG. 1 will now be described in more detail.

Tag 2

Figure 4:
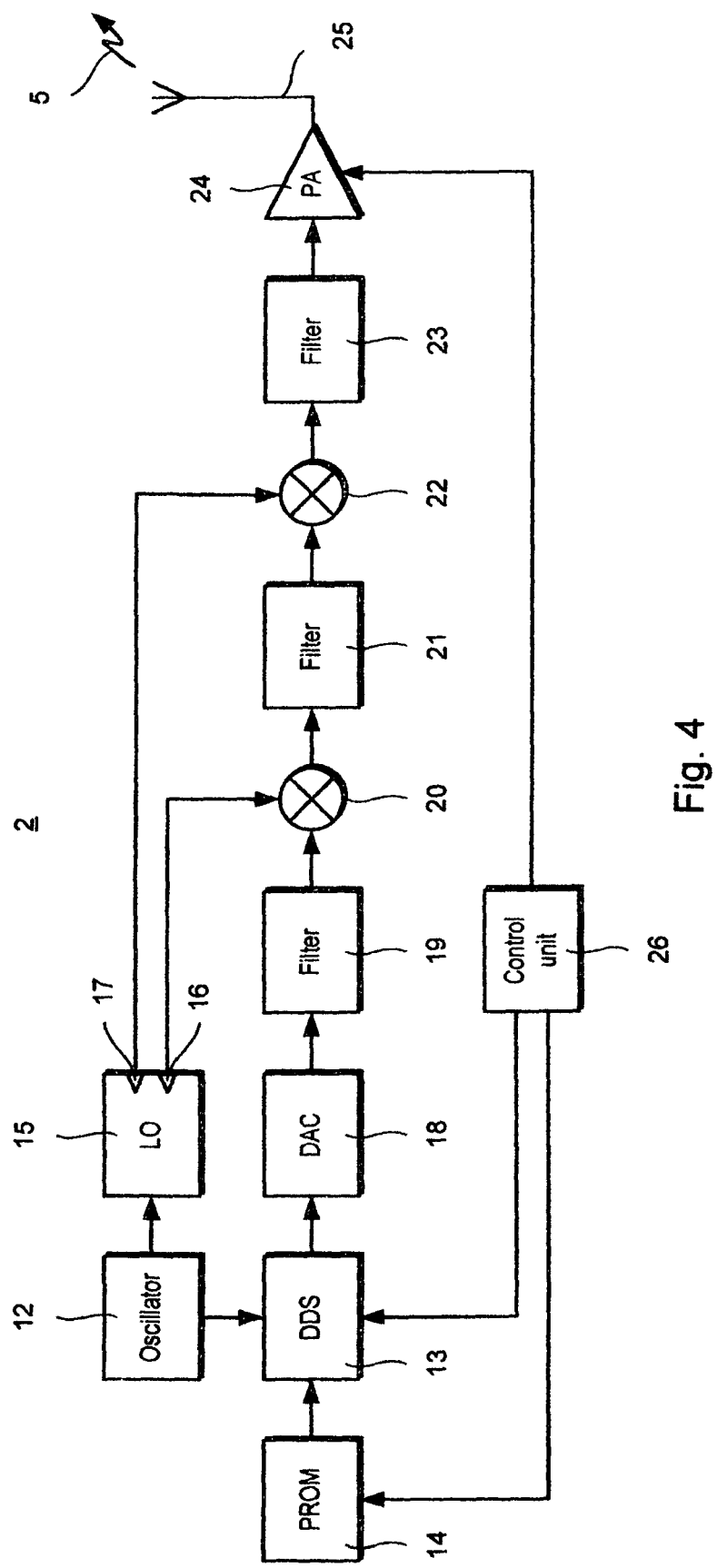
FIG. 4 is a schematic block diagram of the circuitry of a tag.

Referring to FIG. 4, a block diagram of circuitry of the tag 2 is shown. The mobile tag 2 uses direct digital synthesis (DDS), two-stage up-conversion and amplification to generate and transmit the chirp 5 (FIG. 2).

A crystal oscillator 12, operating at 13 MHz, is used to drive a DDS unit 13 which reads a tone sequence from programmable read-only memory 14 and converts the sequence into digital words representing the chirp 5. The crystal oscillator 12 is also used to drive a local frequency synthesiser 15 having first and second outputs 16, 17 for signals having first and second local frequencies respectively.

The signal output from the DDS unit 13 is fed into a digital-to-analogue converter (DAC) 18 which converts the sequence of digital words representing the chirp into analogue signal waveforms centred at a first intermediate frequency of approximately 70 MHz. The output of the DAC 18 is fed into a first band pass filter 19 to reduce digital switching transients and the filtered signal is fed, together with the first local oscillator frequency supplied by the local frequency synthesiser 15, into a first mixer 20 to generate signals at a second intermediate frequency of approximately 450 MHz. A second band pass filter 21 removes unwanted mixing products and the remaining signal is fed, together with the second local oscillator frequency supplied by the local frequency synthesiser 15, into a second mixer 22 to generate a signal which is typically around 2.45 GHz.

The signal output from the second mixer 22 is fed into a third band pass filter 23 to remove unwanted mixing images, amplified by a power amplifier 24 and the chirp 5 is transmitted using the antenna 25.

A logical control circuit 26 controls the rest of the circuitry shown in FIG. 4. The control circuit 26 starts and stops the DDS unit 13 and intermittently turns on and off the power amplifier 24. The tag 2 is powered by a battery (not shown) and incorporates power supply and battery charging logic (not shown).

It will be appreciated that different architectures, including direct synthesis or alternative methods to DDS for generating the tones, can be used.

Receivers 3

Figure 5:
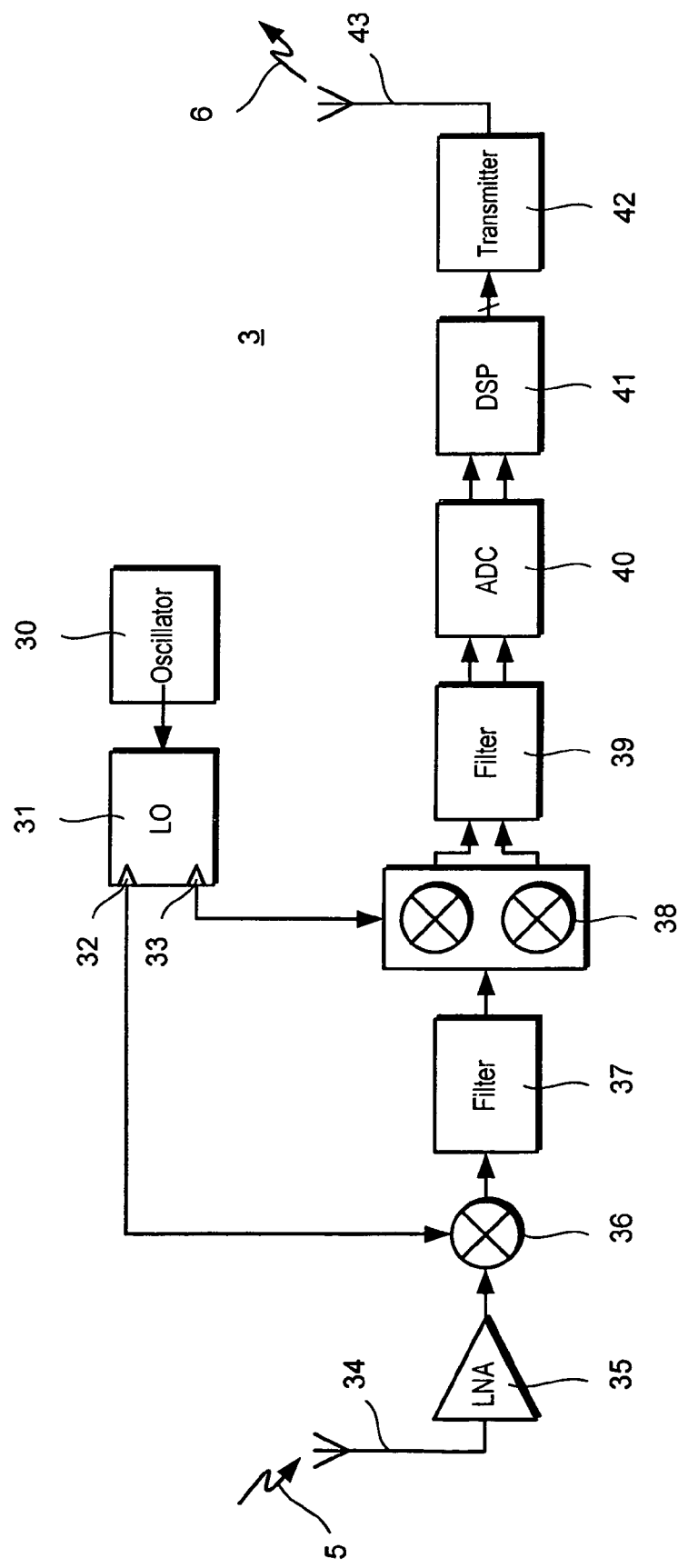
FIG. 5 is a schematic block diagram of the circuitry of a receiver.

Referring to FIG. 5, a block diagram of circuitry of the receivers 3 is shown. Each receiver 3 use two-stage down-conversion from which in-phase (I) and quadrature (Q) components of the received signal are output at a low intermediate frequency (IF).

A crystal oscillator 30 is used to drive a local frequency synthesiser 31 having two outputs 32, 33 for signals having first and second local frequencies.

A signal 5 is received by an antenna 34, amplified by a low noise amplifier 35 and then mixed with the first local oscillator frequency in mixer 36 to produce signals at a high intermediate frequency (around 450 MHz).

The high intermediate signals are filtered by a first band-pass filter 37 to remove unwanted and out-of-band signals and then mixed with the second local oscillator frequency in a quadrature mixer 38 to produce I and Q signals at a low intermediate frequency (around 65 MHz).

The low intermediate frequency I and Q signals are filtered by a second band-pass filter 39 to remove unwanted mixing products and passed to a two-channel analogue-to-digital converter (ADC) 40 which sub-samples the baseband I and Q signals at a rate of 26 MHz. The I and Q sub-samples output from the ADC 40 are then input to a digital signal processor (DSP) 41 which processes the sub-samples to generate phase and frequency offsets for first and second tones 9, 10 (FIG. 2). This is hereinafter described in more detail.

The set of measured phase and frequency data generated by the DSP 41 is passed, together with a time stamp, to data transmitter 42 which places the data in a message 5 and transmits the message 5 to position processor 4 (FIG. 1) via antenna 43.

The receivers 3 can be implemented in software on respective computer systems (not shown). Each computer system (not shown) includes a processor (not shown), memory (not shown) and an input/output (I/O) interface (not shown) operatively connected by a bus (not shown). A computer system (not shown) may include more than one processor. The I/O interface (not shown) is operatively connected to a network interface (not shown), for example in the form of a wireless local area network (WLAN) card, storage (not shown) in the form of a hard disc drive or drives and, optionally, removable storage (not shown).

Computer program codes (not shown) which, when executed by a computer system (not shown), causes the computer system to provide receiver functionality are stored on the hard drive (not shown) and loaded into memory (not shown) for execution by the processor (not shown). The computer program codes (not shown) may be stored on and transferred from removable storage (not shown) or through the network interface (not shown) from a remote source (not shown).

Phase and Frequency Offset Measurement

Figure 6:
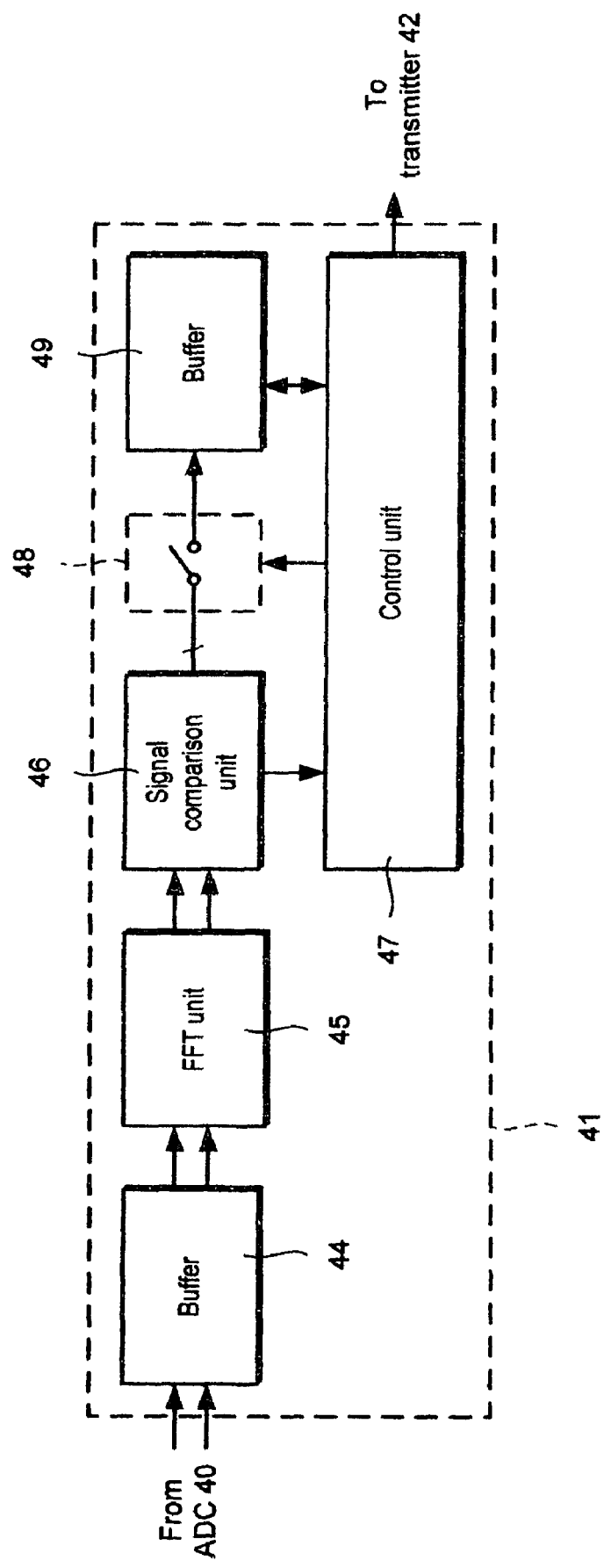
FIG. 6 is a schematic block diagram of a digital signal processor used in a receiver.

Referring to FIG. 6, in the DSP 41, I and Q samples from the ADC 40 are stored in a buffer 44. The buffer 44 passes successive, non-overlapping blocks of 512 I and Q samples, one block at a time, to a complex Fast Fourier Transform (FFT) unit 45 for processing. The FFT unit 45 outputs an FFT in the form of an array of 512 complex values, each complex value corresponding to a different frequency bin, once every 19.7 µs (512/26 MHz). Each complex value contains an amplitude value indicating a power of the received signal and a phase value indicating a phase of the received signal at the time the FFT is taken.

Because the tag 2 transmits only one tone at any one time, one of the frequency bins in the FFT provides amplitude and phase values for the tone. The other frequency bins contain only noise. Furthermore, since the tag 2 transmits a tone for 1 ms, the FFT unit 45 outputs approximately 50 measurements (1 ms/19.7 µs) of amplitude and phase values for the tone.

Frequency bins are spaced by 50.78125 kHz (26 MHz/512) and the two tones 9, 10 (FIG. 2) are arranged to be at an integer multiples of the bin spacing so the difference between the tones is 20 bins (1.015625 MHz/50.78125 kHz). Using integer multiples of bin spacing and centre frequencies simplifies processing signals and computing tag position and velocity. It also simplifies tone generation in the tag 2 thereby reducing tag complexity and cost.

The FFT unit 45 supplies successive FFTs to a signal comparison unit 46. The signal comparison unit 46 determines whether or not a FFT forms part of a chirp 5 (FIG. 2) by comparing amplitude values in a FFT with a predefined threshold. The signal comparison unit 46 passes the result of the comparison to a control unit 47. The control unit 47 controls a switch 48 so that if an amplitude value in the FFT is above the threshold, then the amplitude value and its corresponding phase value are stored in memory 49. While FFTs correspond to a measurement of a chirp 5 (FIG. 2), amplitude and phase values are recorded.

Figure 7:
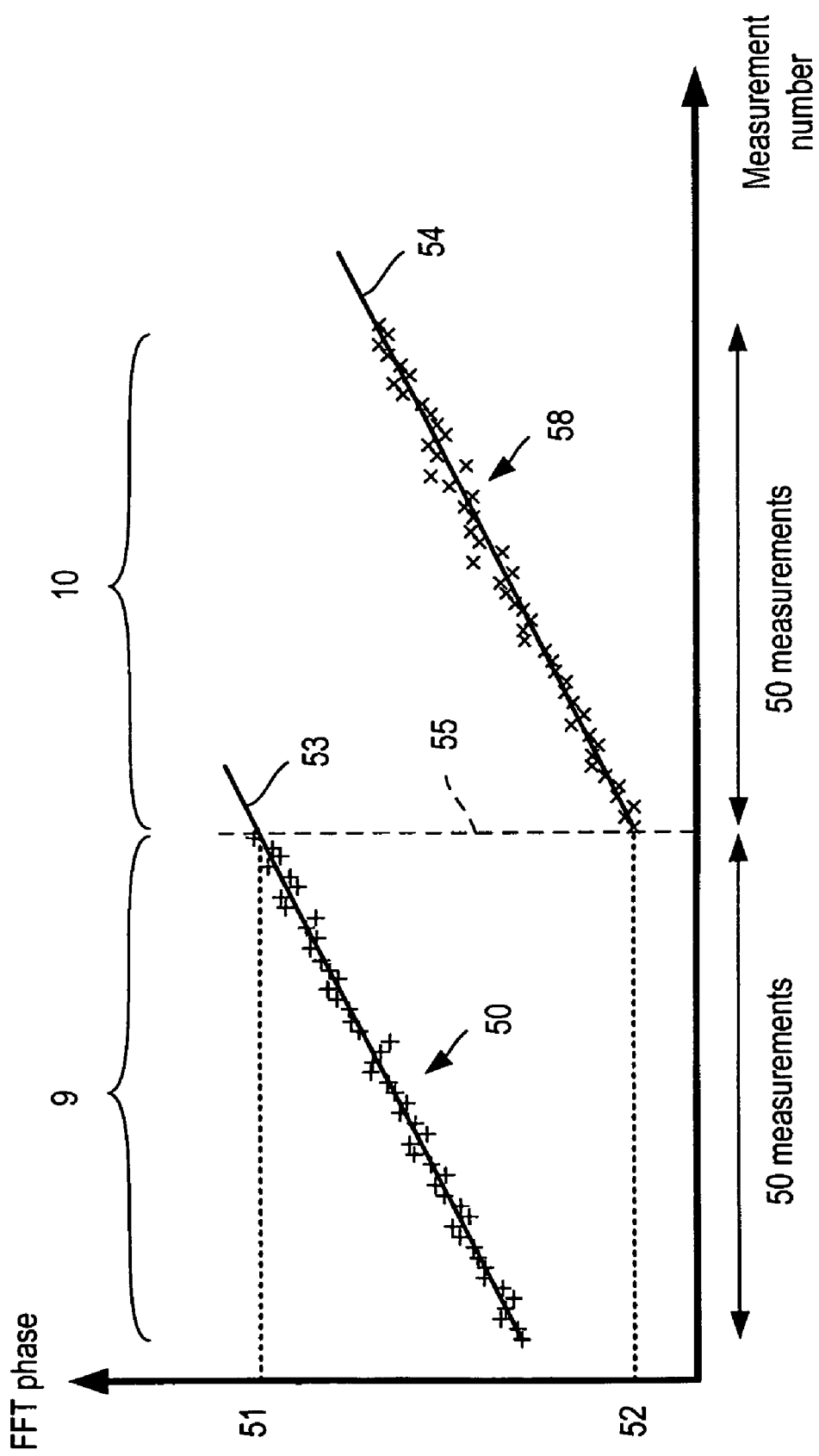
FIG. 7 illustrates how a receiver obtains phase measurements from tones.

The control unit 47 processes the amplitude and phase values for each tone 9, 10 (FIG. 2) to obtain a set of measurement data for each chirp 5 (FIG. 2). The control unit 47 averages amplitude values across each tone 9, 10 (FIG. 2) to obtain first and second power measurements 61, 62 (FIG. 7).

Referring to FIG. 6, the control unit 47 processes phase values 50 to obtain a phase measurement, $\psi_A$, $\psi_B$, 51, 52 for each tone 9, 10 (FIG. 2). The control unit 47 determines the phase offset 51, 52 by fitting straight lines 53, 54 to each set of phase values 50 corresponding to each tone 9, 10 (FIG. 2) and finding phase offsets 51, 52 at an intercept 55 between the tones 9, 10 (FIG. 2). The intercept 53 lies at the centre between the two tones 9, 10 (FIG. 2) to minimize extrapolation to the intercept 55. The control unit 47 also determines a phase slope $v_i$, 61 (FIG. 8) and phase slope variance, $\sigma^2$, 62 (FIG. 8) for each chirp using a least-squares regression algorithm.

Both tones 9, 10 have the same slope because the same clock, i.e. clock 12 (FIG. 4), is used to generate both tones 9, 10 at the tag 2 and the same clock, i.e. clock 30 (FIG. 5) is used to measure the tones 9, 10 at a receiver 3 and because they are separated by an integer number of FFT bin spacings, in this case 20 bins. Thus, a single slope can be used to represent the chirp 5 and there is no need to report separate slopes for individual tones 9, 10.

If the tones 9, 10 are not separated by an integer number of FFT bin spacings, then an additional slope error is introduced which is linearly related to a fraction by which the bins are separated (referred to as the "fractional error"). For example, if the tones 9, 10 are separated by an integer-plus-a-half number of FFT bin spacings, the first tone 9 may occur at the centre of one bin and the second tone 10 may occur half way between two FFT bins. In this case, both bins would yield measurements and the resulting slope would be increased by $+\pi$ radians per FFT sample period. One bin would be positive and the other negative. In general, a phase slope error is given as $2.\pi.e$ where e is the fractional part of the number representing the difference between the multipliers for the two tones 9, 10. If e is known, then the measured phase slope can be corrected by subtracting the slope offset introduced by the fractional error. Thus, in equations (I) above and similar equations, values for $N_1$ and $N_2$ can be replaced by the values $e.N_1$ and $e.N_2$ respectively.

The frequency offset can be measured using a frequency discriminator or by using a phase-locked loop.

The phase slope arises because the frequency of the received signal is not the same as the receiver clock frequency. Since rate of change of phase is frequency, the phase slope represents the frequency difference between the received signal and the receiver clock and is a measure of the frequency difference between transmitter and receiver clocks 12 (FIG. 4), 30 (FIG. 5).

Referring to FIG. 8, the data transmitter 42 (FIG. 4) prepares a message 6 which includes a receiver ID 56, tag ID 57, time 58 at which the signal 5 is received, measured phase ($\psi_A$) 51 for the first tone 9 (FIG. 2), measured phase ($\psi_B$) 52 for the second tone 10 (FIG. 2), measured power ($P_A$) 59 for the first tone 9 (FIG. 2), measured power ($P_B$) 60 for the second tone 10 (FIG. 2), phase slope (v) 61 of the straight line fits 53, 54 and the variance ($\sigma^2$) 62 of the gradient 61.

Position Processor 4

Figure 9:
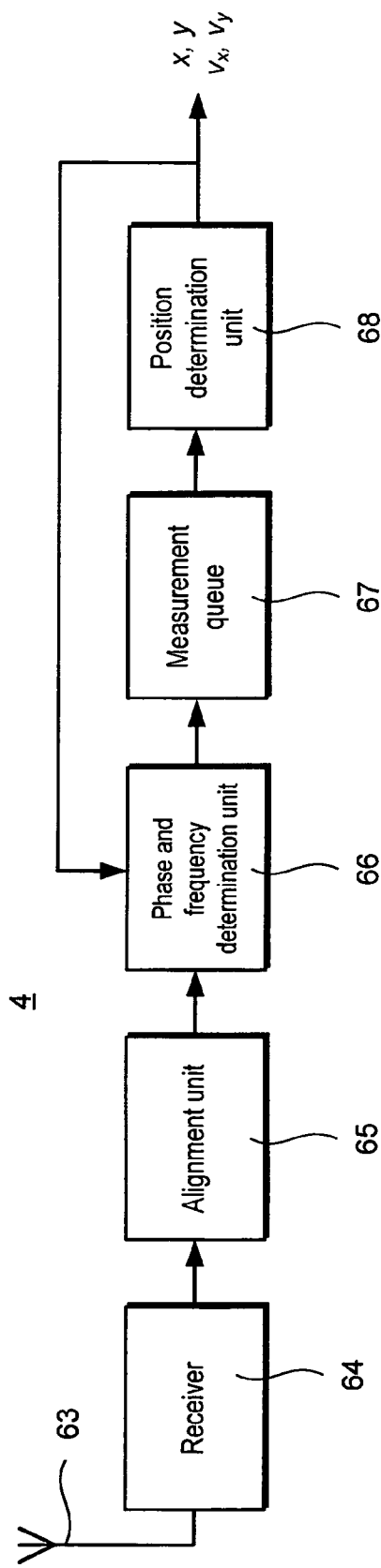
FIG. 9 is a schematic block diagram of a position processor.

Referring to FIG. 9, a block diagram of circuitry of the position processor 4 is shown.

Measurement data transmitted by all the transmitters 3 are received, via an antenna 63, by a receiver 64 which extracts the first tone phase ($\psi_A$) 51, second tone phase ($\psi_B$) 52, phase slope (v) 61 and phase slope variance ($\sigma^2$) 62 (for convenience, herein after referred to as "measured phase and frequency data"), the receiver ID 56 and tag ID 57 (herein referred to as "identity data"), measurement time ($t_j$) 58 and first tone power ($P_A$) 59 and second tone power ($P_B$) 60 (herein referred to as "measured power data") from the message 6.

The extracted data is passed to an alignment unit 65 which processes the received phase and frequency data by grouping together data for the same chirp 5 (FIG. 2) from all receivers 3. Data may not arrive at the position processor in the order that it was transmitted due to network latency. The alignment unit 65 does this by using the transmitted time stamp 58 and by waiting until data from all of the receivers 3 for a given chirp 5 (FIG. 2) has or should have been received.

The aligned measurements for a chirp 5 (FIG. 2) are passed to a phase and frequency determination unit 66 shown in FIG. 9 as a phase and frequency determination unit and also referred to as a phase and frequency generation unit. The phase and frequency generation unit 66 optionally generates phase offsets $\Phi_{Ti1}$ between a receiver or transmitter (which may be fixed) and a "system clock" (such as one of the receivers), relative phase offsets $\Delta\Phi_{i1}$ between receivers (or a receiver and transmitter), frequency offsets $V_{r,Ri}$ between a receiver (or transmitter) and a "system clock" and relative frequency offsets $\Delta V_{r,Ri}$ between receivers (or a receiver and transmitter) for each chirp 5 (FIG. 2) transmitted by the tag 2 (FIG. 1).

The phase and frequency generation unit 66 generates measured phase differences $\Theta_{Ri}$ and measured frequency differences $v_{i,j}$, optionally using the offsets, and adds these to a measurement queue 67. A position determination unit 68 takes the phase and frequency data from the queue 67 and computes a position and velocity of the tag 2 (FIG. 1) using the most recently-generated phase and frequency data as well as previously-generate phase and frequency data, as will now be described in more detail.

-Phase and Frequency Generation Unit 66-

Figure 10:
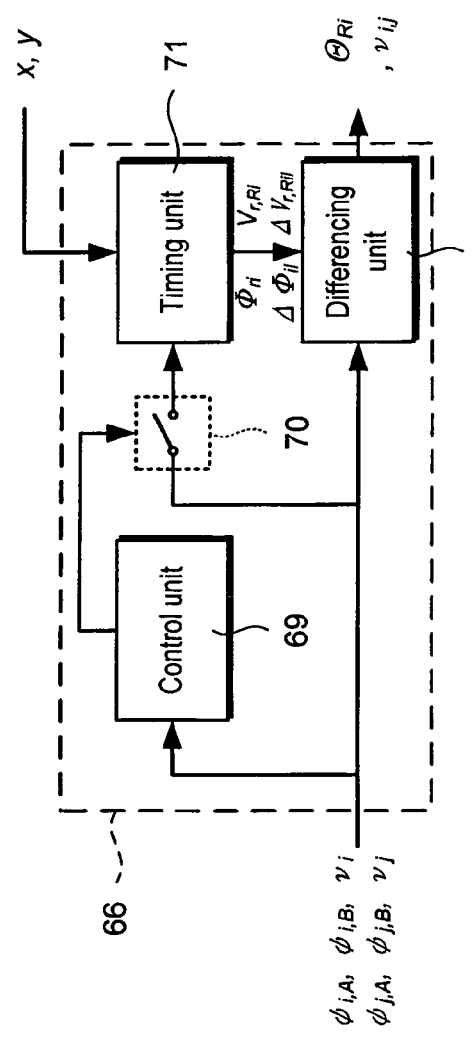
FIG. 10 is a schematic block diagram of a phase and frequency difference determination unit used in a position processor.

Referring also to FIG. 10, the phase and frequency difference determination unit 66 is shown in more detail.

The phase and frequency difference determination unit 66 includes a control unit 69, a switch 70, a timing unit 71 and a differencing unit 72.

The differencing unit 72 generates measured phase differences $\Theta_{Ri}$ and measured frequency differences $v_{i,j}$ using the measured phase and frequency data 51, 52, 61, 62.

If one or more fixed tags 2' (FIGS. 13 and 21) and/or one or more mobile tags 2 (FIG. 22) are used for pseudo-synchronisation, then the control unit 69 also channels the measured phase and frequency data 51, 52, 61, 62 to the timing unit 71 to generate the phase offsets $\Phi_{Ri}$, relative phase offsets $\Delta\Phi_{i1}$, frequency offsets $V_{r,Ri}$ and relative frequency offsets $\Delta V_{r,Ri1}$ which are then passed to the differencing unit 72 to generate measured phase differences $\Phi_{Ri}$, and measured frequency differences $V_{i,j}$. If pseudo-synchronisation is not used, then the timing unit 71 provide null values to the differencing unit 72.

The timing unit 71 may use previous values of position to help resolve the cycle component of $\Theta_{Ri}$.

Figure 11:
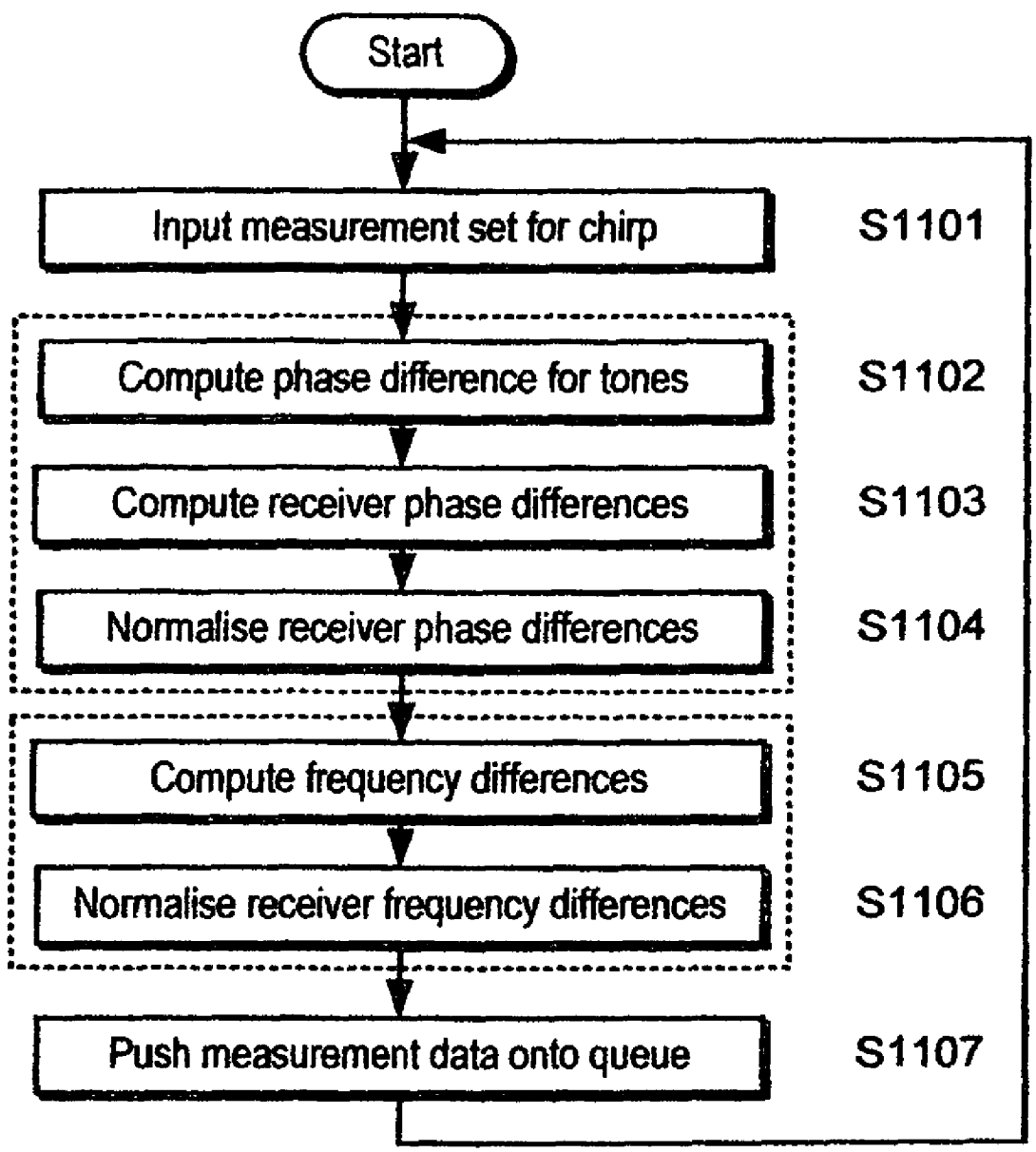
FIG. 11 is a process flow diagram of a method of determining phase differences and frequency differences, performed by a position processor.
Figure 12:
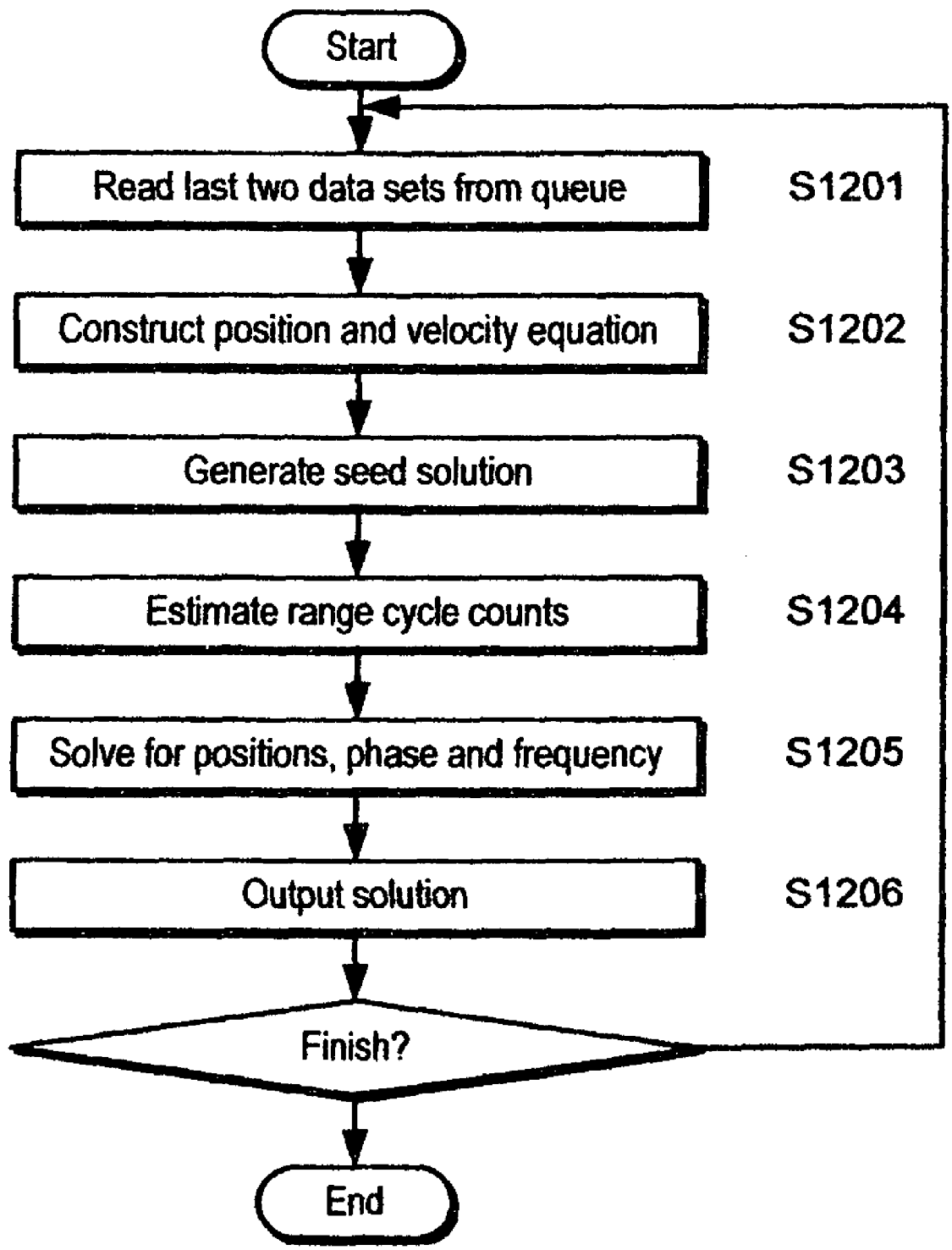
FIG. 12 is a process flow diagram of a method of determining a position and velocity of a tag, performed by a position processor.

Referring to FIGS. 11 and 12, operation of the phase and frequency difference generation unit 66 will now be described in more detail.

The phase and frequency generation unit 66 intermittently receives measured phases $\psi_{i,A}$, $\psi_{i,B}$ and measured frequency offsets $v_i$ (i.e. phase slopes) from the alignment unit 65 (step S1101).

The phase and frequency generation unit 78 subtracts the phases 51, 52 of the two tones 9, 10 (FIG. 2) to generate a measured phase difference $\Theta_{Ri}(t_j)$ for the pair of tones transmitted at a j-th time and received by an i-th receiver 3 (step S1102). This process eliminates phase shifts and errors (known as "common mode effects") introduced in the tag 2 and receiver 3 and which affect both tone phases. Provided no differential effects are introduced, only the unknown clock offsets and the phase change introduced by the range over which the signal has propagated remain as significant parameters. A detailed explanation of how common mode errors are eliminated is given in WO-A-03016940.

The measured phase difference $\Theta_{Ri}$ represents the phase of a notional signal formed by subtracting the two tones 9, 10 (FIG. 2). Thus, if the frequency difference between the two tones 9, 10 (FIG. 2) is 1 MHz, then this represents the phase of a 1 MHz signal propagation between tag 2 and receiver 3 and is equivalent to taking a range measurement by measuring time of flight.

Optionally, the phase and frequency generation unit 66 may compute the differences $\Delta\Phi_{i1}$ between the phase differences $\Theta_{Ri}$ for pairs of receivers 3 (step S1103). The differences between phase differences may be used if hyperbolic location algorithms based on trilateration (or multilateration) are employed. However, the phase and frequency generation unit 66 need not compute the differences between the phase differences for pairs of receivers if the position determination unit 68 uses directly measured individual fixed receiver phase differences.

Optionally, the phase and frequency generation unit 66 may subtract the receiver phase offsets $\Delta\Phi_{i1}$ determined in step S1103 from the measured phases (step S1104). Receiver phase offsets are the differences between actual phases of the receiver clocks. However, this step need not be executed, for example, if it is assumed that the receivers 3 are synchronised and so the offsets are zero. However, embodiments in which this assumption is not made and in which offsets are subtracted are described hereinafter.

Optionally, the phase and frequency generation unit 66 may determine frequency offsets $V_{r,Ri}$ using chirps transmitted by two or more fixed tags 2' (FIG. 21) and this will be described in more detail later (step S1105).

The phase and frequency generation unit 66 may also subtract the frequency offsets $\Delta V_{r,Ri1}$ between fixed receivers 3 determined in step S1005 (step S1106). However, this step need not be executed, for example, if the frequency offsets of each receiver relative to the tag are used directly. If the receivers 3 are not perfectly synchronised, then the frequency offsets are adjusted by subtracting the individual receiver offsets from each measurement. The phase slope represents the frequency offset $v_i$ between the tag 2 and the receiver 3.

The phase difference and other differences, together with contextual information, such as tag ID, receiver IDs and measurement time, are stored in queue 79. This data is a "measurement set" for the particular chirp 5.

Referring to FIGS. 10 and 12, operation of the position determination unit 68 will now be described in more detail.

The position determination unit 68 reads two (or more) sets of measurements from the queue 67 (step S1201).

The position determination unit 68 constructs equations based on equations (I) and (J) above defining position and velocity of the tag 2 according to the number of sets of measurements (step S1202). The number of measurements and, thus, the number of equations, depends on several factors, such as the number of the receivers 3, the number of chirps 5 and the number of tones 9, 10 in each chirp 5.

The position determination unit 68 provides a range equation $f_{j,i}(x_j, y_j, \Phi_T)$ based on equation (I) above for each measured phase difference, $\Theta_{Ri}(t_j)$, arising from each measurement of a chirp 5 received by each receiver 3.

Likewise, the position determination unit 68 provides a pair of velocity equations $g_{j,k,i}(x_j, y_j, x_k, y_k, V_r)$ based on equation (J) above for each pair of frequency measurements, $v_{j,i}$ and $v_{k,i}$.

The equations include at least four unknowns, namely at least two positions, $(x_j, y_j)$ and $(x_i, y_j)$, of the tag 2 (for example, $(x_1, y_1)$ at time $t_1$ and $(x_2, y_2)$ at time $t_2$), network phase $\Phi_T(t_0)$ and network velocity $V_r$.

The position determination unit 68 estimates a starting position and velocity (hereinafter referred to as a "seed") (step S1203).

A seed can be estimated in any one of several ways. For example, the seed may be based on the last position calculated. Alternatively, the seed may be estimated using the relative power levels $P_A$, $P_B$ of the chirps 5 received by the receivers 3. The seed may be based on application-specific context information, such as a known position of the tag 2 at the start of a race.

Since the ranges to the receivers 3 may be more than one wavelength, the position determination unit 68 estimates the number of cycles $C_i$ (i.e. wavelengths) to be added to the equations (step S1204). Typically, the numbers of cycles is chosen to minimise residual errors $\epsilon$ in the range equations based on the seed position.

The position determination unit 68 solves the set of equations using a numerical minimisation algorithm (step S1205), namely:

$$P(x_j, y_j, x_k, y_k, \Phi_T, V_r) = f_{j,i}^2 + w \cdot g_{j,k,i}^2 \quad \text{(K)}$$

Reference is made to "Numerical Recipes in C++" Ed. Press, Vetterling, Teukolsky and Flannery (Cambridge University Press, Second Edition, 2002) which discloses a number of different of methods for numerically solving equation (K). In minimising equation (K), it is assumed that any unknown residual errors are zero.

The position determination unit 68 outputs a set of positions and velocities for each chirp 5 (FIG. 2), a phase offset and a frequency offset between tag 2 and fixed receivers 3 (step S1206). The position and velocity for the most recent chirp 5 (FIG. 2) is output providing the current position and velocity of the tag 2.

The position and velocity may be fed back to the phase and frequency determination unit 66 so as to refine calculations of offset.

The position processor is implemented in software on a computer system (not shown). The computer system (not shown) includes a processor (not shown), memory (not shown) and an input/output (I/O) interface (not shown) operatively connected by a bus (not shown). A computer system (not shown) may include more than one processor. The I/O interface (not shown) is operatively connected to a network interface (not shown), for example in the form of a wireless local area network (WLAN) card, storage (not shown) in the form of a hard disc drive or drives and, optionally, removable storage (not shown). Other elements, including peripheral devices such as keyboards (not shown) and displays (not shown), may be temporarily or permanently provided.

Computer program codes (not shown) which, when executed by a computer system (not shown), causes the computer system to provide receiver functionality are stored on the hard drive (not shown) and loaded into memory (not shown) for execution by the processor (not shown). The computer program codes (not shown) may be stored on and transferred from removable storage (not shown) or through the network interface (not shown) from a remote source (not shown).

Pseudo-Synchronisation Using a Fixed Tag 2'

The position processor 4 can determine a position and velocity of the tag 2 whether or not the clocks of the receivers 3 are synchronised. If, however, the clocks of the receivers 3 are unsynchronised, then there are several ways to address the situation.

Firstly, it can be assumed that all the receivers 3 are synchronised and that they are synchronised to a "system clock". Thus, no element or node in the system 1 measures or makes any allowance for clock offsets and the position processor 4 determines position and velocity based on the measured data, for example, as hereinbefore described.

Secondly, an element or node in the system 1, e.g. the phase and frequency difference determination unit 66 (FIG. 9), measures the phase offset between the clocks at one or more different times. Based on the measured offsets, the system 1 can then derive clock offsets for the receivers 3 for any given time and correct for the clock offsets and synchronise the clocks to one clock, such as the clock in the fixed tag 2'. This is known as "pseudo-synchronisation".

Figure 13:
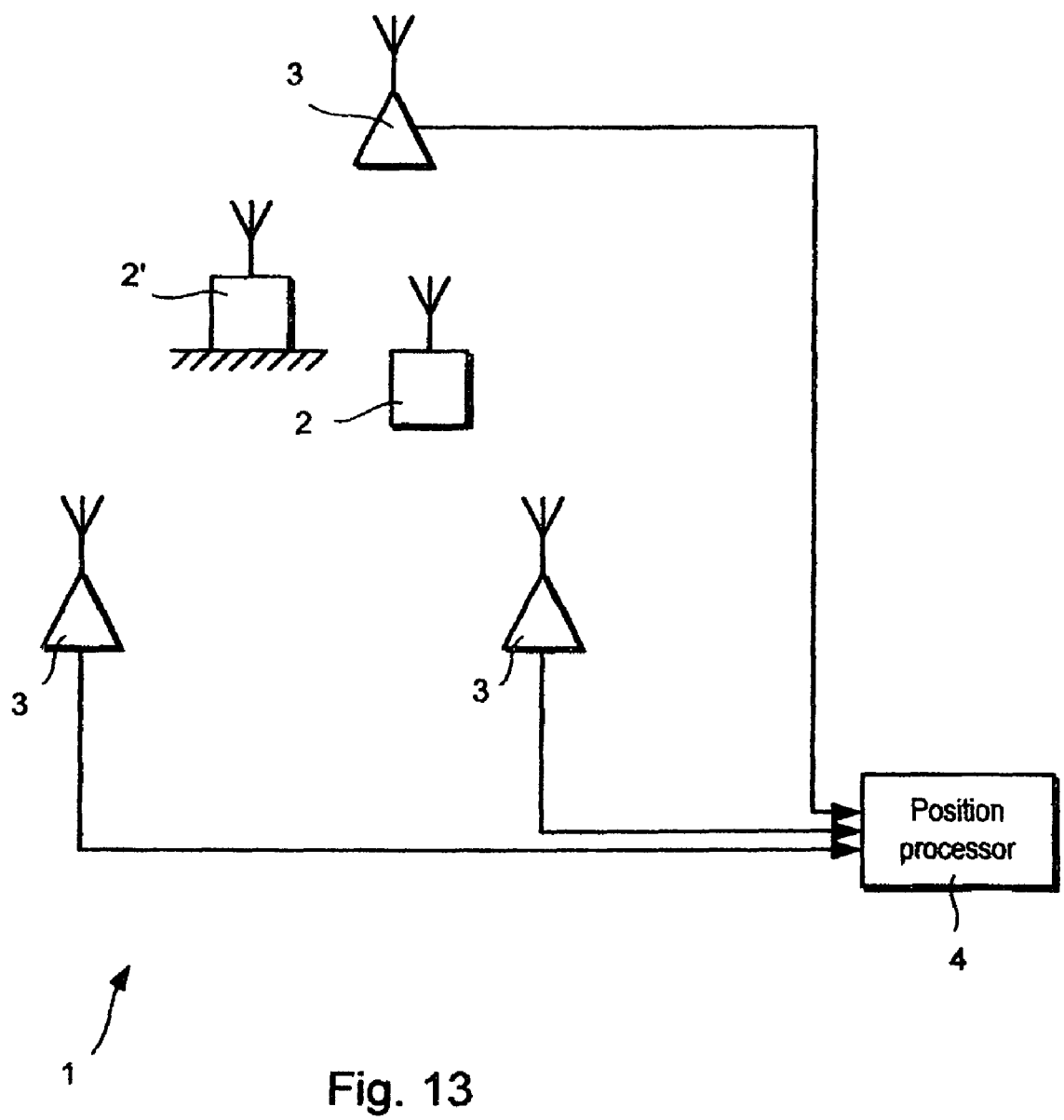
FIG. 13 illustrates use of a fixed tag for pseudo-synchronisation.

Referring to FIG. 13, a stationary tag 2' having a known, fixed position can be used to pseudo-synchronise the receivers 3. The stationary tag 2' may be the mobile tag 2, held at a known, fixed position. Alternatively, the stationary tag 2' may be another, different tag which is identical to the mobile tag 2, held at a known, fixed position. However, the fixed tag 2' need not be identical to the mobile tag 2 and need not transmit chirps 5 having the same structure as the mobile tag 2. Instead, any chirp structure can be used.

Pseudo-synchronisation is based on the fact that, in equation (A) above, there is only one unknown, namely $\Phi_{Ti}$, for a tag 2' known position and that, in equation (D) above, the network velocity (in meters per second), V, is equal to the phase slope $v_i$, for a stationary tag 2' (i.e. $v_x=v_y=0$). Thus, if the phase offset $\Phi_{Ti}(t_1)$ at time $t_1$ is known, then the phase offset $\Phi_{Ti}(t_2)$ at time $t_2$, can be derived based on equation (G) above, namely:

$$\Phi_{Ti}(t_2) = \Phi_{Ti}(t_1) + (t_2 - t_1) \cdot V_r \cdot \frac{2\pi}{\lambda} \quad (G\text{-}1)$$

The phase and frequency difference determination unit 66 (FIG. 9) can be arranged to identify a fixed tag 2' (e.g. using a tag ID or by identifying a stationary tag), to measure the phase offset $\Phi_{Ti}(t_u)$ at time $t_u$ for an i-th receiver 3 and to store the phase offset $\Phi_{Ti}(t_u)$.

Whenever the phase and frequency difference determination unit 66 (FIG. 0) receives a measured phase difference $\Phi_{Ti}(t_u)$ at time $t_P$ for the mobile tag 2 from the i-th receiver 3, then it can derive a phase offset $\Phi_{Ti}(t_v)$ at time $t_P$ for an i-th receiver 3 using:

$$\Phi_{Ti}(t_v) = \Phi_{Ti}(t_u) + (t_v - t_u) \cdot V_r \cdot \frac{2\pi}{\lambda} \quad (G\text{-}1')$$

The phase and frequency difference determination unit 66 (FIG. 9), then adjusts the phase difference $\Theta_{Ri}$ by subtracting the phase offset $\Phi_{Ti}(t_v)$ thereby pseudo-synchronising the i-th receiver 3 to the fixed tag 2'.

The phase and frequency difference determination unit 66 (FIG. 9) continues by passing a now modified phase difference $\Theta_{Ri}'$ to the measurement queue 67 (FIG. 9).

It is noted that the position determination unit 68 (FIG. 9) need not know that the phase difference $\Theta_{Ri}$ derived from measurements has been normalised.

Using More Than Two Tones

A chirp 5 (FIG. 2) having two positioning tones 9, 10 (FIG. 2) which are separated by 1 MHz has an ambiguity range of approximately 300 m and so can be used to position the tag 2 (FIG. 1) to a within a few meters. By increasing the number of tones, performance can be further improved.

Figure 14:
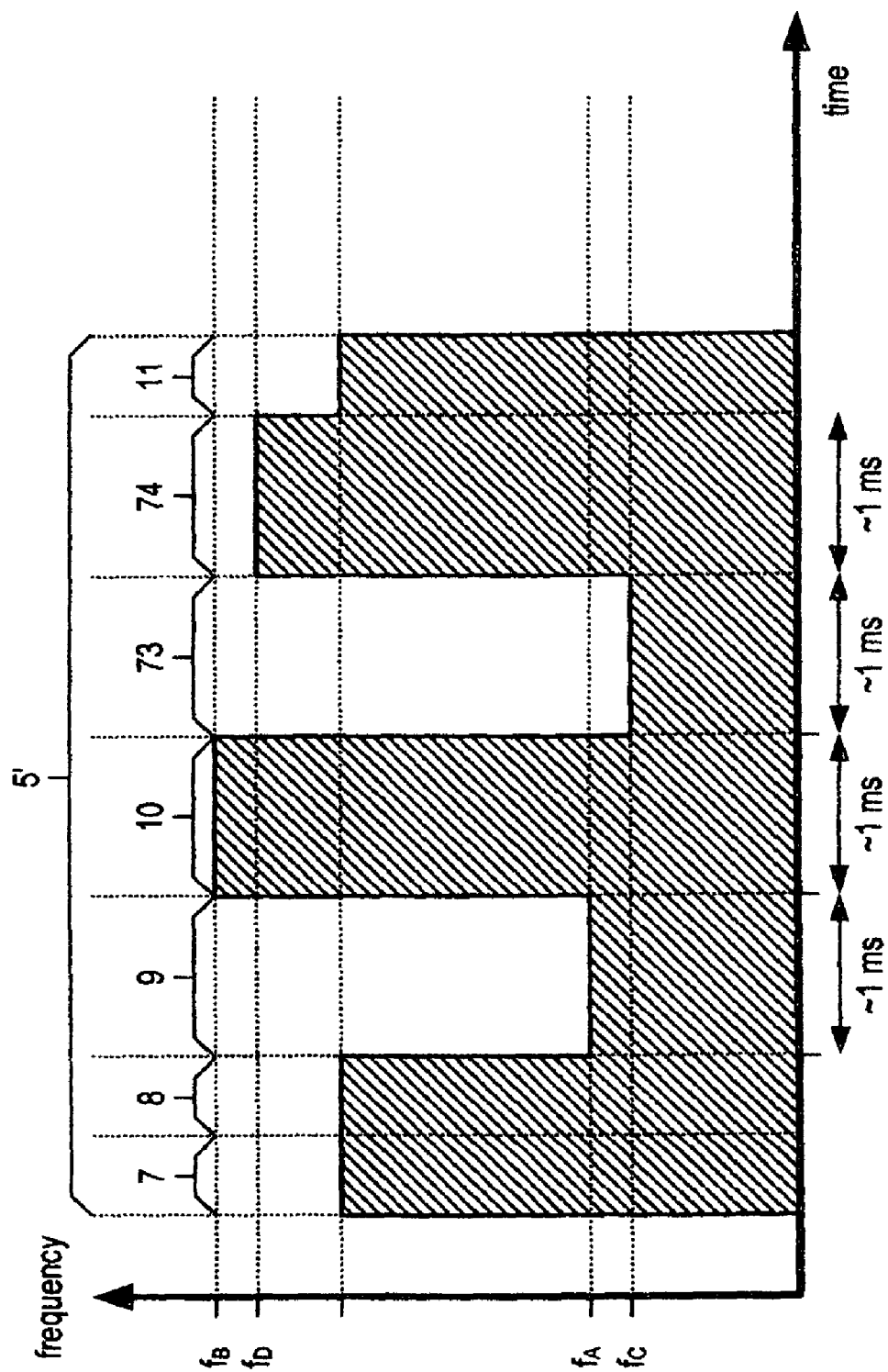
FIG. 14 illustrates a second chirp structure.

Referring to FIG. 14, the tag 2 (FIG. 1) may be modified to transmit a modified chirp 5' similar to the chirp 5 (FIG. 2) described earlier, but which includes two additional tones 73, 74. However, in other embodiments, the first and second positioning tones 9, 10 may be different frequencies.

The receivers 3 receive modified chirps 5' in a similar way to that described earlier, except that each tone phase is extracted at the centre of the tone 9, 10, 73, 74. The receivers 3 extract tone powers and a phase slope for the tones across the entire chirp in the same way as described earlier. The receivers 3 send a modified message (not shown) which includes additional phase and power information.

In this embodiment, the tones 9, 10, 73, 74 are arranged to have the following frequency differences:

TABLE 1

| Pair of tones | Frequency difference (bins) | Frequency difference (MHz) |
| --- | --- | --- |
| Second tone 10 - first tone 9 | 194 | 9.8515625 |
| Second tone 10 - third tone 73 | 201 | 10.207021 |
| Fourth tone 74 - third tone 73 | 162 | 8.2265625 |
| First tone 10 - third tone 73 | 7 | 0.35546875 |
| Second tone 10 - fourth tone 74 | 39 | 1.980468 |
| Fourth tone 74 - first tone 9 | 155 | 7.8710938 |

The phase and frequency difference determination unit 66 (FIG. 9) extrapolates values of phase from the mid-point between any pair of tones before subtracting one phase from another to obtain a measured phase difference $\Theta_{Ri}$. This is done using the phase slope $v_i$ and the time difference between the centre of the tone and the mid point between the tones 9, 10, 73, 74. The frequency difference between the fourth tone 74 and the first tone 9 has quite a large time separation so that each tone 9, 74 is extrapolated a full tone length. Thus, six values of measured phase difference $\Theta_{Ri}$ can be obtained from each chirp 5'.

Taking the difference between pairs of tones yields signals having effective wavelengths which fall into three groups:

In a so-called "long wavelength" group, the effective frequency is about 355 kHz which corresponds to approximately 844 m. This allows good cycle ambiguity resolution and, using a seed position based on power levels and proximity to the fixed receivers, yields reliable positioning with accuracy of around 20 m.

In a so-called "medium wavelength" group, the effective frequency is about 1.98 MHz corresponding to approximately 152 m. The position calculated using the long wavelength provides the ambiguity resolution and the medium wavelength yields a positioning accuracy of around 3 m.

In a so-called "short wavelength" group, the effective frequencies are 8.23 MHz, 9.85 MHz and 10.21 MHz (ignoring the sixth difference 7.87 MHz for reasons already given) corresponding to wavelengths of around 30 m. The medium wavelength calculation provides ambiguity resolution and the short wavelengths yield positioning accuracy of around 0.5 m. Furthermore, having three different tone pairs provides additional robustness and redundancy allowing errors in the tone measurements (due to multipath or other interference) to be more easily detected and corrected. In addition, by combining the results from all three tone difference pairs, better accuracy can be achieved because the overall measurement (integration) time is longer and so improves signal to noise ratio. Combining the results from all three tone difference pairs also provides frequency diversity.

Using multiple different frequencies can help to resolve cycle ambiguities by using longer wavelengths to seed the position calculations for the shorter wavelengths.

Figure 15:
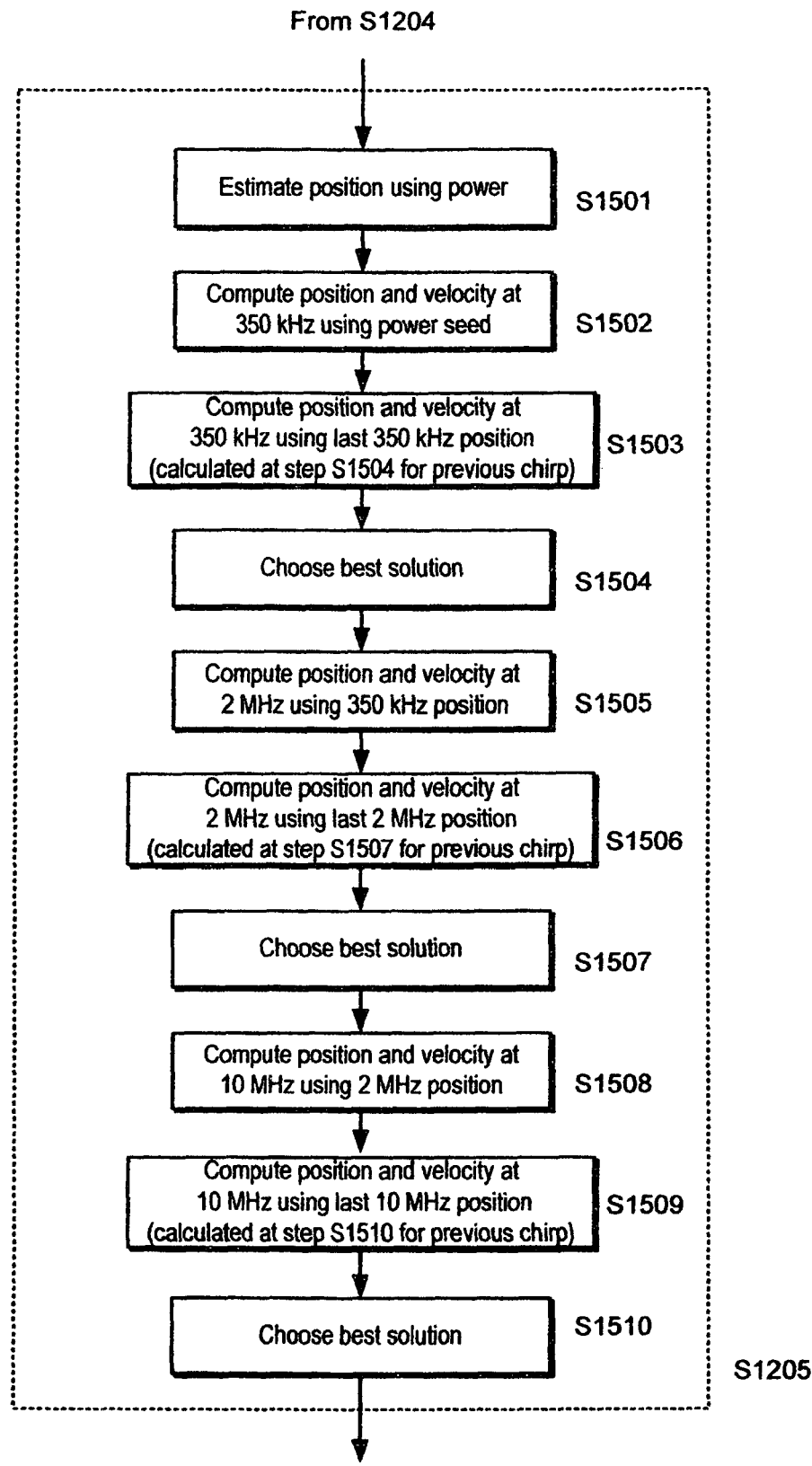
FIG. 15 is a process flow diagram of a method of determining a position and velocity of a tag, performed by a position processor, based on the second chirp structure shown in FIG. 14.

Referring to FIGS. 9 and 15, operation of the position determination unit 68 at step S1205 (FIG. 12) using a modified chirp 5' (FIG. 14) is shown in more detail.

The position determination unit 68 estimates an initial position using the powers 59, 60 (FIG. 8) of the first and second tones 9, 10 (FIG. 14) measured at each receiver 3 (step S1501).

Using this initial position as a seed, the position determination unit 68 computes a first solution using the 350 kHz frequency differences by solving equation (K) (step S1502). Using the position of the tag 2 calculated from a previous set of 350 kHz frequency differences a seed, the position determination unit 68 computes a second solution using a current set of 350 kHz frequency differences by solving equation (K) (step S1503). Steps S1502 and S1503 are independent and so may be reversed or performed in parallel. Only one of the two steps, e.g. S1502, need be performed. For example, no previous position may be available. The position determination unit 68 chooses the better of the two solutions (the "better 350 kHz solution"), for example by choosing the solution with the lower cost (step S1404).

Using the better 350 kHz solution as a seed, the position determination unit 68 computes a third solution using the 2 MHz frequency differences by solving equation (5) (step S1505). Using the position of the tag 2 calculated from a previous set of 2 MHz frequency differences a seed, the position determination unit 68 computes a fourth solution by solving equation (K) using the 2 MHz measurements (step S1506). Steps S1505 and S1506 are independent and so may be reversed or performed in parallel. Only one of the two steps need be performed. The position determination unit 68 chooses the better of the third and fourth solutions (the "better 2 MHz solution") (step S1507).

Using the better 2 MHz solution as a seed, the position determination unit 68 computes a fifth Solution using the 10 MHz frequency differences by solving equation (K) (step S1508). Using the position of the tag 2 calculated from a previous set of 10 MHz frequency differences a seed, the position determination unit 68 computes a fourth solution by solving equation (K) using the 10 MHz measurements (step S1509). Steps S1508 and S1509 are independent and so may be reversed or performed in parallel. Only one of the two steps need be performed. The position determination unit 68 chooses the better of the third and fourth solutions (the "better 10 MHz solution") (step S1510).

Each of the calculations yield phase and frequency offsets. The position determinations unit 68 may be arranged to solve multiple sets of equations (i.e. 12 equations based on equations (I) and (J) above) independently using each of the four different sets of 10 MHz frequency difference data and to choose the best solution. Alternatively, the position determination unit 68 may be set up to solve a single, larger set of equations (e.g. 48 equations) using the four different sets of 10 MHz frequency difference data.

The use of multiple different frequencies can be used to detect gross multipath in which the error is greater than half a wavelength. For example, for a 10 MHz wavelength measurement, if a particular signal has an error of approximately 30 m due to multipath, then this corresponds to a range error close to zero since 30 m is approximately one wavelength. This makes detection of multipath difficult to detect. However, for 2 MHz wavelength measurement will indicate an error of the order of 30 m, which much larger than expected. Therefore, using multiple, different frequencies allows gross multipath errors (that are harmful to the shortest wavelength calculations, but which are not easily detected by them) to be detected.

Figure 16:
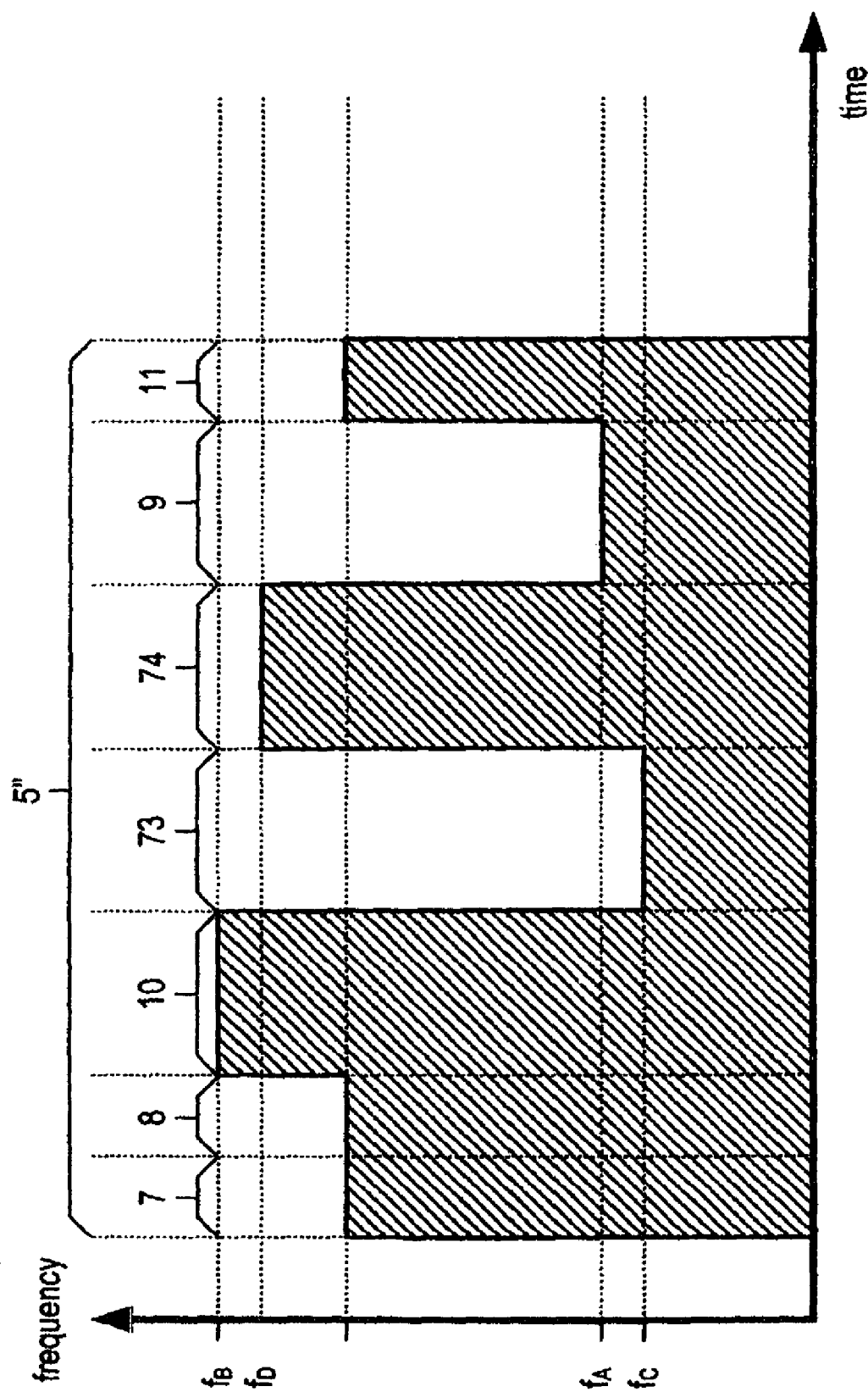
FIG. 16 illustrates a third chirp structure.

The sequence in which the tones 9, 10, 73, 74 are transmitted can be changed and, as shown in FIG. 16 for chirp 5", polarity of the frequency difference can be reversed. This can facilitate frequency planning and allow more tags to co-exist in a given band. Using a 26 MHz master clock and 50.78125 kHz bin spacing, around 80 tags can be deployed before frequency re-use is required.

Figure 17:
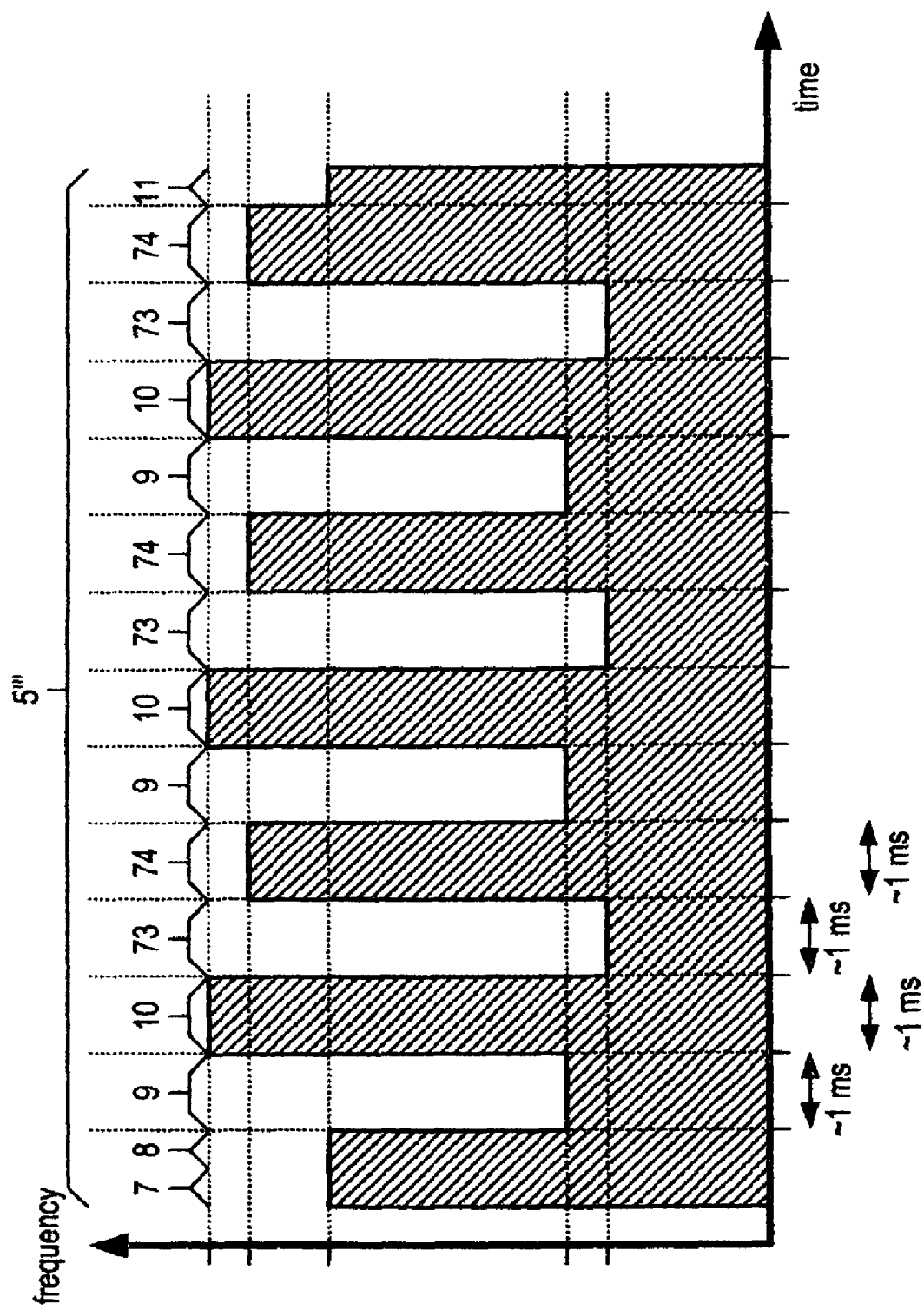
FIG. 17 illustrates a fourth chirp structure.

Referring to FIG. 17, the tag 2 (FIG. 1) may be modified to transmit a modified chirp 5''' similar to the chirp 5' (FIG. 14) described earlier, but in which tones 9, 10, 73, 74 are concatenated.

As shown in FIG. 17, the tones 9, 10, 73, 74 are repeated sequentially three times. In this case, each frequency difference occurs three times. On two occasions, the sixth frequency difference ($f_4-f_D$) between fourth tone 74 and first tone 9 occurs between adjacent tones, thereby making it usable and providing a fourth frequency difference (7.87 MHz) to the set of short wavelengths.

In a triple-length chirp 5''', the duration of each tone may be reduced (e.g. to 0.33 ms) so that its duration is the same as the modified chirp 5' (FIG. 14) hereinbefore described. However, using longer chirps and a greater number of tone differences provides better accuracy and improved robustness.

In some embodiments, the tag 2 (FIG. 1) may be modified to transmit continuously by simply cycling through a sequence of (e.g. four) tones. This allows the system 1 to compute and update the position of the tag 2 (FIG. 1) continuously and rapidly. Using tone lengths of 0.5 ms, position updates can be output continuously at a rate as high as 2 kHz. This is useful in high-speed applications, such as tracking in motor or aerial sports.

Using More than Two Chirps

In the previous embodiments two chirps 5 (FIG. 2) are used together to calculate position and velocity using measurements. However, using more than two chirps to compute position and velocity can lead to additional robustness and improved performance, as will now be explained.

Figure 18:
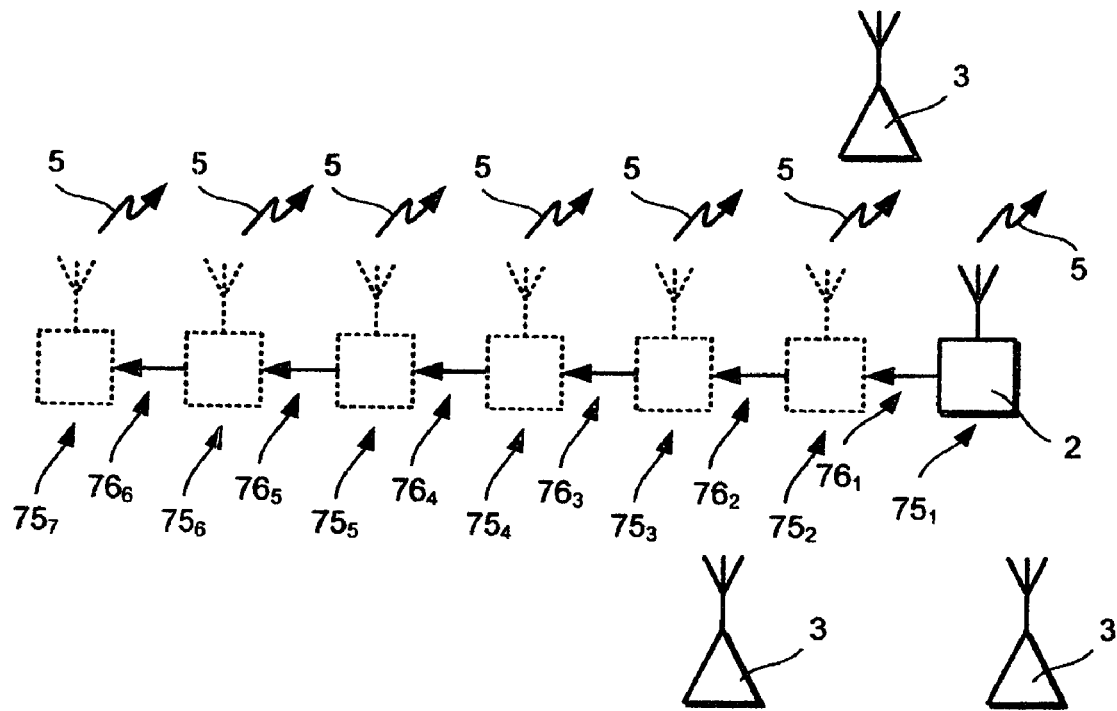
FIG. 18 illustrates velocity velocities between successive chirps transmitted by the tag.

Referring to FIG. 18, positions $75_1, \ldots, 75_7$ of the tag 2 (from a relatively old position $75_1$ to a relatively new (e.g. current) position $75_7$) as it transmits seven successive chirps 5 are shown. The seven positions $75_1, \ldots, 75_7$ are linked by six velocity vectors $76_1, \ldots, 76_6$.

For each chirp 5 transmitted from each position $75_1, \ldots, 75_7$, each receiver 3 reports a set of measurements to the position processor 4 (FIG. 1) as described earlier. This produces a set of 21 (i.e. 7×3) versions of position equation (I) above and a set of 36 (i.e. 6×6) versions of velocity equations (J) formed by considering three looking forwards and three backwards for each of the six velocity vectors $76_1, \ldots, 76_6$.

Assuming that the clocks 12 (FIG. 4), 30 (FIG. 5) are stable over the period of time shown in FIG. 17, then the network phase $\Phi_T(t_0)$ and the network velocity $V_r$ are constant.

Thus, in this embodiment, the position determination unit 68 (FIG. 9) solves a system of 57 equations (i.e. 21+36) for which there are 16 unknown parameters, namely seven values of x, seven values of y, the network phase $\Phi_T(t_0)$ and the network velocity $V_r$, based on 42 measurements, i.e. phase and phase slope measurements for each of the three receivers for each of the seven chirps 5.

Figure 19:
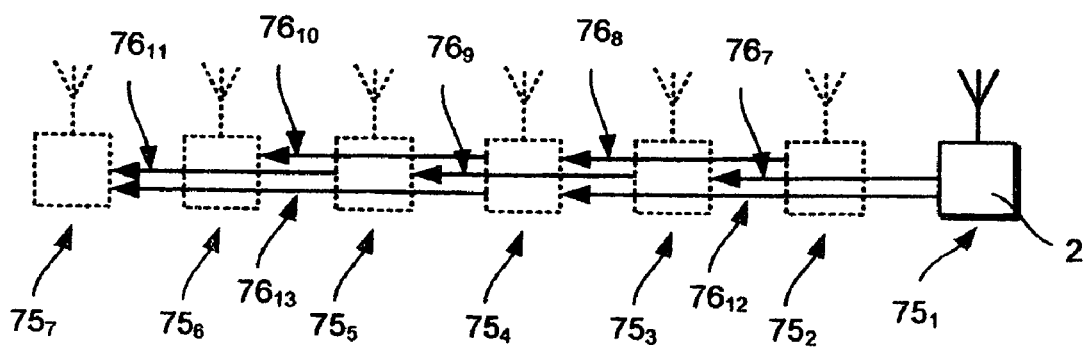
FIG. 19 illustrates velocity velocities between non-adjacent chirps.

Referring to FIG. 19, further information can be extracted by considering additional (in this case, five) velocity vectors 76$_7$, ..., 76$_{11}$ linking every second (i.e. "alternative") position 75$_1$, ..., 75$_7$ and velocity vectors 76$_{12}$, 76$_{13}$ linking every third position 75$_1$, ..., 75$_7$. Additional velocity vectors linking other pairs (e.g. every fourth, every fifth and so on) may be considered. Thus, an additional 7 velocity vectors 76$_7$, 76$_8$, 76$_9$, 76$_{10}$, 76$_{11}$, 76$_{12}$, 76$_{13}$ can be obtained.

For the arrangement shown in FIGS. 18 and 19, the position determining unit 68 (FIG. 9) calculates positions and velocities using chirps 5 from seven positions 75$_1$, ..., 75$_7$. However, the position determining unit 68 (FIG. 9) can use chirps 5 from fewer or more positions. Using more positions provides greater accuracy, but increases computational complexity since the system of equations to be solved is larger.

In some embodiments, the position determining unit 68 (FIG. 9) calculates positions and velocities using an overlapping block of chirps, e.g., when the position determining unit 68 (FIG. 9) receives measurement data for a predetermined number of new chirps (e.g. one), it discards measurement data for a corresponding number of the oldest chirps and calculates a new set of positions. However, in some embodiments, the position determining unit 68 (FIG. 9) calculates positions and velocities using a non-overlapping block of chirps 5. Thus, measurement data for a number of chirps are stored until the position determining unit 68 (FIG. 9) is ready to calculate positions and velocities.

Using multiple chirps leads to highly over-determined sets of equations and can have the advantages that erroneous measurement data can be detected and the effect thereof mitigated. The faulty data can be identified by inspecting residual values of each of version of equations (I) and (J) after solving.

Multipath usually affects phase and frequency measurements in different ways. For example, a reflected signal propagates further than a direct signal and the additional distance introduces an additional phase difference. However, the reflected signal does not affect a frequency measurement, but may do so if the tag 2 is moving. Furthermore, the frequency offset depends on the direction of the travel relative to the reflector.

Using the two types of measurement data helps the position processor 4 to distinguish good measurements from bad. For example, the position processor 4 may inspect residual errors $\epsilon$ in each instance of the position and velocity equations (I) and (J) above. If the residual error is large for a given equation, then this implies the measurement is less reliable. This may bee due to a noise arising, for example, from multipath effects. Thus, the position processor 4 may assign a smaller weighting $w_{i,j,k}$ and, thus, mitigate for the less reliable measurement.

Using More than Three Fixed Receiver 3

In the system shown in FIG. 1, only three receivers 3 are illustrated. However, more than three receivers 3 may be used. Using more than three receivers 3 helps to extend the area of coverage, to achieve greater robustness and redundancy and improve performance through statistical averaging and spatial diversity of measurements and to provide additional measurements to enhance the ability of the system to detect and mitigate radio reception errors caused by interference or multipath.

With larger numbers of receivers 3 covering a greater area, it is unlikely that every receiver 3 will receive every chirp 5 from the mobile tag 2. Thus, different sets of measurements for different chirps 5 usually comprise measurements from different sets of receivers 3. In fact, two successive chirps 5 may even be received by a completely different fixed receivers 3, i.e. no one receiver 3 receiving both chirps 5.

Figure 20:
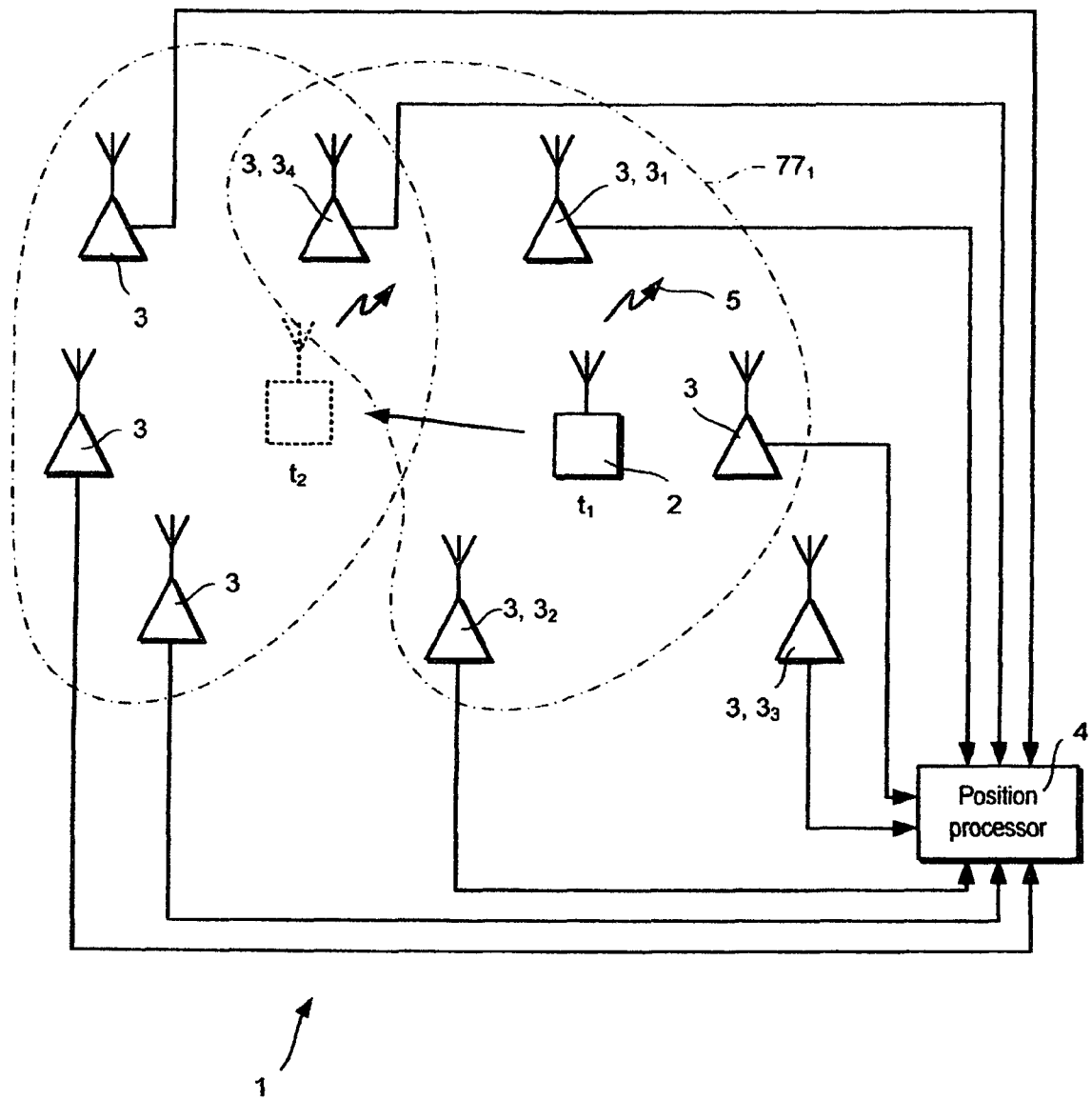
FIG. 20 illustrates additional receivers used in the system shown in FIG. 1.

Referring to FIG. 20, the system 1 is shown again, but eight fixed receivers 3 are illustrated. It will be appreciated the system 1 can include more than eight fixed receivers 3.

The tag 2 transmits chirps 5 at times $t_1$ and $t_2$. The chirp 5 transmitted at $t_1$ is received at a first group 77$_1$ of receivers 3 and the chirp 5 transmitted at $t_2$ is received at a second group 77$_2$ of receivers 3. In this example, both chirps 5 are received by the first receiver 3$_4$.

The position processor 4 receives sixteen measurements, namely eight phase measurements and eight phase slope measurements and constructs sixteen equations comprising eight sets of equation (I) above and eight sets of equation (J).

The position determination unit 68 (FIG. 9) solves equation (K) to find the position of the tag 2 at $t_1$, namely $(x_1, y_1)$, the position of the tag at $t_2$, namely $(x_2, y_2)$, network phase $\Phi_T(t_0)$ and network velocity $V_r$. Having more measurements and equations than unknowns allows residual errors $\epsilon_{1,i}, \epsilon_{2,i}, \epsilon_{3,i}, \epsilon_{4,i}$ to be analysed and those measurements with significant measurement errors caused by noise or multipath can be mitigated, as described earlier.

Using additional receivers 3 adds computational complexity since each fixed receiver measurement adds at least two more instances of equations (I) and (J) to the equation set. However, additional measurements improve performance through statistical averaging and spatial diversity. This improvement is of the order of $\sqrt{N}$ where N is the number of receivers 3 receiving a chirp 5. Thus, the ideal number of fixed receivers to use is a trade-off between the computational load that can be tolerated and the improvements in performance and ability to detect and mitigate bad measurements.

Receiver Synchronisation Using More than One Fixed Tag

As explained earlier, a fixed tag 2' (FIG. 13) can be used to pseudo-synchronise the receivers 3. However, more than one fixed tag can be used, which can provide additional advantages.

Firstly, additional fixed tags can be used to provide redundancy in the event that a fixed tag fails.

Secondly, measurements of chirps transmitted from more than one fixed tag can be used to synchronise the fixed receivers. Extra measurements allow system errors to be detected and mitigated, such as transient errors caused by reflective objects moving around the tracking area and causing perturbations in the radio environment and, thus, measurement or multipath errors.

Figure 21:
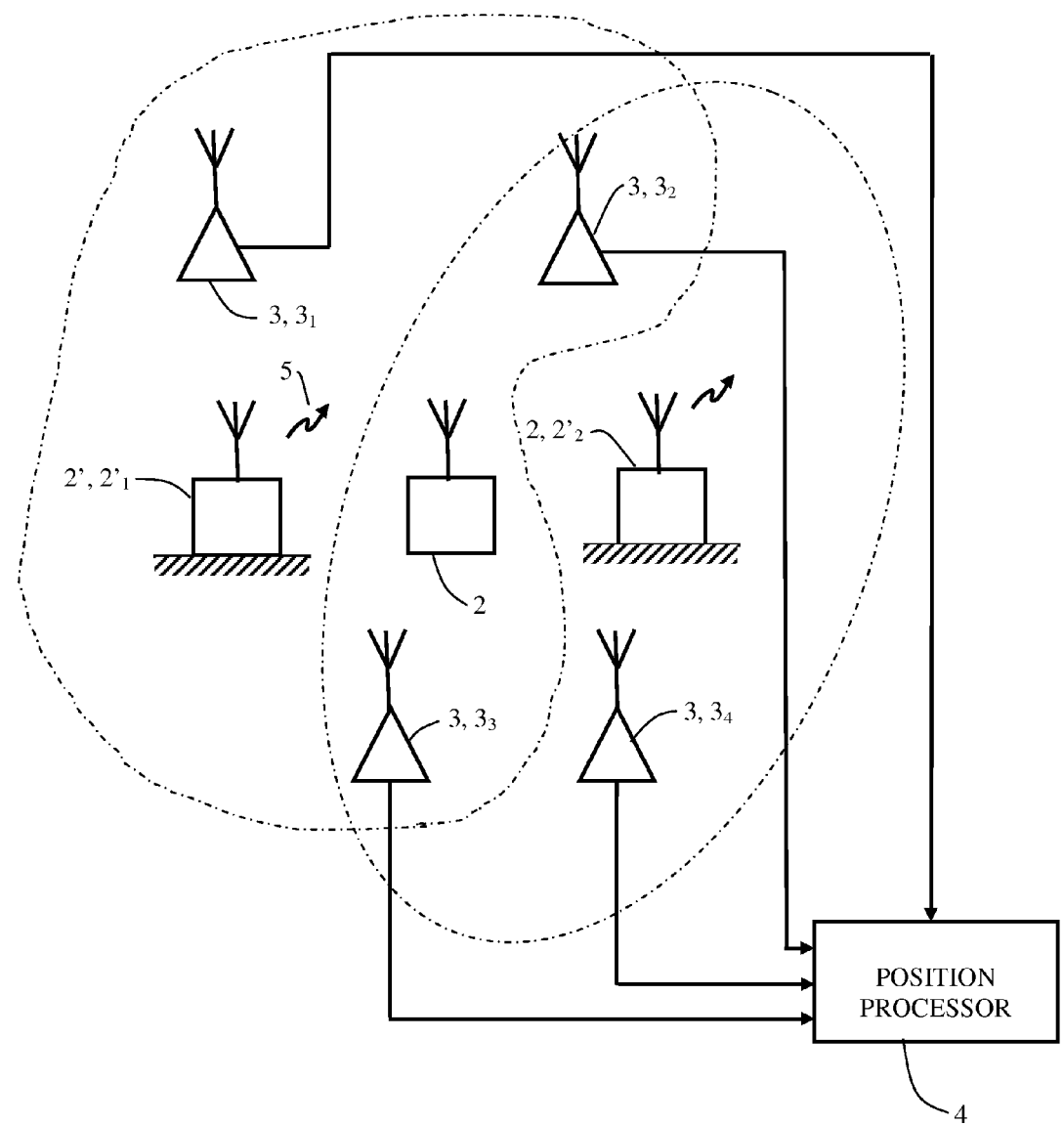
FIG. 21 illustrates use of two fixed tags for synchronisation.

Referring to FIG. 21, the system 1 includes four fixed receivers 3 and two fixed tags 2'. The fixed tags 2' may be identical to the mobile tag 2, held at a known, fixed positions. However, the fixed tags 2' need not be identical to the mobile tag 2 and need not transmit chirps 5 having the same structure as the mobile tag 2. Instead, any chirp structure can be used.

Chirps 5 from each fixed tags 2' are received by three of the fixed receivers 3. Chirps 5 from a first fixed tag 2'$_1$ are received by first, second and third receivers 3$_1$, 3$_2$, 3$_3$. Chirps 5 from a second fixed tag 2'$_2$ are received by second, third and fourth receivers 3$_2$, 3$_3$, 3$_4$.

In the embodiments described earlier, it is assumed that all the receivers 3 are synchronised or that the phase and frequency offsets between the receivers are known, so that the relative offsets can be determined. Relative offsets can be determined by measuring and tracking offsets of each fixed receiver clock, relative to a master, system clock. The system clock can be one of the fixed tags, one of the fixed receivers or a virtual clock derived from measurements and located at a virtual position, such as the origin of the coordinate frame used.

In this embodiment, there is no fixed system clock reference. Instead, receiver timings are measured and tracked only as timing relationships between pairs of receivers 3. These steps are performed by the phase and frequency difference determination unit 68 (FIG. 9).

At time $t_1$, the first fixed tag $2'_1$ located at position $(x_1, y_1)$ transmits a chirp 5 which is received by first, second and third receivers $3_1, 3_2, 3_3$.

Based on equation (A) above, the phase offset $\Theta_{R1}$ between the first fixed tag $2'_1$ and the first receiver $3_1$ located at position $(X_1, Y_1)$ is given by:

$$\Theta_{R1} = \Phi_{T11} + (N_1 - N_2)\frac{\omega}{2\pi \cdot c}\sqrt{(x_1 - X_1)^2 + (y_1 - Y_1)^2} \qquad \text{(A-1)}$$

where $\Phi_{T11} = \Phi_{R1} - \Phi_{f1}$ and $\Phi_{R1}$ is the phase offset for the first fixed receiver $3_1$ and $\Phi_{f1}$ is the phase offset for the first fixed tag $3_1$.

Similarly, the phase offset between the first fixed tag $2'_1$ and the second receiver $3_2$ located at position $(X_2, Y_2)$ is given by:

$$\Theta_{R2} = \Phi_{T21} + (N_1 - N_2)\frac{\omega}{2\pi \cdot c}\sqrt{(x_1 - X_2)^2 + (y_1 - Y_2)^2} \qquad \text{(A-2)}$$

where $\Phi_{T21} = \Phi_{R2} - \Phi_{f1}$ and $\Phi_{R2}$ is the phase offset for the second fixed receiver $3_2$ and $\Phi_{f1}$ is the phase offset for the first fixed tag $3_1$.

Substituting for $\Phi_{T11}$ and $\Phi T_{12}$, then subtracting the second range equation (A-2) from the first range equation (A-1) yields the following relationship:

$$\Theta_{R1} - \Theta_{R2} = \Phi_{R1} - \Phi_{R2} + (N_1 - N_2)\frac{\omega}{2\pi \cdot c}\left(\sqrt{\begin{array}{l}(x_1 - X_1)^2 + \\ (y_1 - Y_1)^2\end{array}} - \sqrt{\begin{array}{l}(x_1 - X_2)^2 + \\ (y_1 - Y_2)^2\end{array}}\right) \qquad \text{(M)}$$

Equation (M) can be solved directly to find relative phase offset, $\Delta\Phi_{R12}$, between the first and second receivers $3_1, 3_2$, namely:

$$\Delta\Phi_{R12} = \Phi_{R1} - \Phi_{R2} \qquad \text{(O)}$$

The relationship depends only on the phase differences $\Theta_{Ri}$ obtained from measurements at the first and second receivers $3_1, 3_2$ and the ranges between the fixed tag $2'_1$ and the first and second receivers $3_1, 3_2$. The relationship does not depend on the fixed tag clock.

Thus, if the chirp 5 transmitted by the first fixed tag $2'_1$ is received by first, second and third fixed receivers $3_1, 3_2, 3_3$, then relative phase offsets between the first and second fixed receivers $3_1, 3_2$, first and third fixed receivers $3_1, 3_3$ and the second and third fixed receivers $3_2, 3_4$ can be derived, namely $\Delta\Phi_{R12}, \Delta\Phi_{R13}, \Delta\Phi_{R23}$.

Based on equation (D) above and using similar procedure to derive equation (O) above, a relative frequency offset $\Delta V_{R12}$ relationship between the first and second receivers $3_1, 3_2$ can be derived, namely:

$$\Delta V_{R12} = V_{R1} - V_{R2} \qquad \text{(P)}$$

Thus, relative frequency offsets between the first and second fixed receivers $3_1, 3_2$, first and third fixed receivers $3_1, 3_3$ and the second and third fixed receivers $3_2, 3_4$ can be derived, namely $\Delta V_{R12}, \Delta V_{R13}, \Delta V_{R23}$. The frequency relationship does not depend on the fixed tag clock.

Based on equation (G) above, the relative phase offset $\Delta\Phi_{Ril}(t_2)$ between i-th and l-th fixed receivers 3 at time $t_2$ based on relative phase offset, $\Delta\Phi_{Ril}(t_1)$ found at time $t_1$ (assuming the clocks are stable between $t_1$ and $t_2$) is given by:

$$\Delta\Phi_{Ril}(t_2) = \Delta\Phi_{Ril}(t_1) + (t_2 - t_1) \cdot \Delta V_{Ril} \cdot \frac{2\pi}{\lambda} \qquad \text{(Q)}$$

At time $t_2$, the second fixed tag $2'_2$ located at position $(x_2, y_2)$ transmits a chirp 5 which is received by second, third and four receivers $3_2, 3_3, 3_4$. Thus, relative phase offsets between the second and third fixed receivers $3_2, 3_3$, second and fourth fixed receivers $3_2, 3_4$ and the third and fourth fixed receivers $3_3, 3_4$ can be derived, namely $\Delta\Phi_{R23}, \Delta\Phi_{R24}, \Delta\Phi_{R34}$. Likewise, relative frequency offsets between the second and third fixed receivers $3_2, 3_3$, second and fourth fixed receivers $3_2, 3_4$ and the third and fourth fixed receivers $3_3, 3_4$ can be derived, namely $\Delta V_{R23}, \Delta V_{R24}, \Delta V_{R34}$.

The relative phase and frequency offsets, $\Delta\Phi_{Ril}, \Delta V_{Ril}$ are independent of the fixed tag clocks and so measurements for pairs that are common to both fixed tags may be combined. Measurements may be combined after adjustment for the time difference by averaging. In this example, this applies to the relationship between the second and third fixed receivers $3_2, 3_3$ which receive chirps 5 from the first and second fixed tags $2'_1, 2'_2$.

The phase relationship $\Delta\Phi_{Ril}$ between any pair of receivers 3 that can receive a common fixed tag chirp transmission can be estimated for other times provided that the clocks are stable for the duration of the time interval. With good design, clock stabilities of 10 s to 60 s may be realised in practice.

If, for a pair of receivers 3 (such as first and fourth receivers $3_1, 3_4$), both receivers 3 do not share chirps 5 from any fixed tag 2', then a relative offset $\Delta\Phi_{Ril}$ can be computed indirectly by reference to other fixed receivers 3. In this example, either the second or third receiver $3_2, 3_3$ can be used since the first and fourth receivers $3_1, 3_4$ can both be referenced to either of these fixed receivers $3_2, 3_3$. Thus, a relative phase offset $\Delta\Phi_{R14}$ between the first and fourth receivers $3_1, 3_4$ can be found using either equation (R-1) or (R-2), namely:

$$\Delta\Phi_{R14} = \Delta\Phi_{R12} - \Delta\Phi_{R24} \qquad \text{(R-1)}$$

$$\Delta\Phi_{R14} = \Delta\Phi_{R13} - \Delta\Phi_{R34} \qquad \text{(R-2)}$$

Furthermore, the relative phase offset $\Delta\Phi_{Ril}$ can be computed using both equations and then an average of the two values can be taken.

Frequency offsets $\Delta V_{Rij}$ between pairs of fixed receivers 3 can be calculated in the same way as for phase offsets $\Delta\Phi_{Rij}$, by constructing frequency differences between pairs of fixed receivers.

The phase and frequency relationships $\Delta\Phi_{Ril}, \Delta V_{Ril}$ between pairs of fixed receivers 3 can be modelled, tracked and smoothed using a phase and frequency locked loop. This approach provides excellent noise suppression and accurate estimation of the likely phase and frequency offsets over time.

Each tracking loop (not shown) can be updated using all measurements from all available fixed tags 2', thereby improving overall performance and at the same time introducing fault tolerance through the use of multiple fixed tags.

The synchronisation state achieved is independent of any single clock whether fixed tag or fixed receiver clock.

This means that when a chirp 5 from mobile tag 2 is received at a given time, e.g. $t_3$, the phase relationships between the fixed receivers 3 receiving the chirp 5 may be calculated using equations (O) to (R) and this allows all fixed receiver clock offsets to be normalised against one of the fixed receivers 3, thereby achieving synchronisation of their clocks.

Thus, phases may be normalised to the first fixed receiver $\mathbf{3}_1$ and so the following phase and frequency offsets are used and passed to the position determination unit 68 to calculate position and velocity, namely:

$$\Theta_{R1}' = \Theta_{R1}$$

$$\Theta_{R2}' = \Theta_{R2} + \Delta\Phi_{12} + \Delta V_{R12} \cdot (t_3 - \tau_{12})$$

$$\Theta_{R3}' = \Theta_{R3} + \Delta\Phi_{13} + \Delta V_{R13} \cdot (t_3 - \tau_{12})$$

$$v_{R1}' = v_{R1}$$

$$v_{R2}' = v_{R2} + \Delta V_{R12}$$

$$v_{R3}' = v_{R3} + \Delta V_{R13} \tag{S}$$

where $\tau_{12}$ is the time (herein referred to as the "last time") at which the tracking loop linking the i-th and l-th fixed receivers 3 was last updated. It is assumed that the frequency offsets between fixed receivers is constant over the time spanning $t_3$ and all $\tau_{12}$. Note also that each pair of fixed receivers 3 can be updated at different last times.

In order to calculate positions and velocity using multiple chirps, they are normalised to a common fixed receiver to ensure that the network phase and network velocity parameters are constant across the measurements for all chirps in the combined set of equations.

There are different ways to choose which receiver 3 is used as a timing reference.

The simplest way is to choose one receiver 3 according to predetermined rule, such as choosing a receiver 3 at random or choosing a fixed receiver 3 designated a priori, such as the first receiver $\mathbf{3}_1$.

However, it may be desirable to chose the fixed receiver 3 that gives the "best" timing relationships for all those that received the chirps 3 from the mobile tag 2. Assuming that each pair of fixed receivers 3 is modelled and tracked using a phase and frequency locked loop, the model incorporates the concept of tracking error. This may be a measure of the loop noise, error variance, quality of the chirps received from the fixed tags or other parameters. This error metric may be used to estimate which one of the fixed receivers (the "chosen receiver") amongst those that received the mobile tag chirp has the best timing relationship with all others. The chosen receiver is then used as the timing reference. The receiver may be chosen, for example, using a conventional sum of squares method according to which receiver 3 has the smallest total tracking error. A receiver 3 which does not receive any chirps from the mobile tag 2 need not be taken into consideration and, thus, is not chosen.

Synchronising Receivers 3 Without Fixed Tags

Referring again to FIG. 1, as explained earlier, one way of dealing with unsynchronised clocks in the receivers 3 is simply to assume that the clocks are in fact synchronised. However, it is possible to synchronise the clocks without using fixed tags, as will now be described in more detail.

Assuming that the receivers 3 are not synchronised, each receiver has an (initially) unknown phase offset and an (initially) unknown fixed frequency offset relative to the tag 2. In particular, for an i-th receiver 3 at time $t_u$, the receiver 3 has a phase offset (in radians), $\Phi_{Ri}(t_u)$, and a fixed frequency offset (in radians per second), $\Delta V_{r,Ri}$. Therefore, the phase offsets $\Phi_{Ri}(t_u)$ for three receivers 3 shown in FIG. 1 at times $t_1$ and $t_2$ when chirps 5 are transmitted may be expressed as follows:

$$\Phi_{R1}(t_2) = \Phi_{R2}(t_1) + (t_2 - t_1) \cdot \Delta V_{r,R1}$$

$$\Phi_{R2}(t_2) = \Phi_{R2}(t_1) + (t_2 - t_1) \cdot \Delta V_{r,R2}$$

$$\Phi_{R3}(t_2) = \Phi_{R2}(t_1) + (t_2 - t_1) \cdot \Delta V_{r,R3} \tag{T}$$

It is assumed that $\Delta V_{r,Ri}$ is constant between $t_1$ and $t_2$.

Equations (I-1) and (J-1) can be re-written as follows $$f_{1,i}(x_1, y_1, \Phi_T, V_{r,Ri}) = (N_1 - N_2)\frac{\omega}{2\pi \cdot c} \cdot |r_{1,i}(x_1, y_1)| + \tag{I-1}$$
$$\Phi_{Ri}(t_0) + (t_1 - t_0) \cdot V_{r,Ri} - C_{1,i} \cdot 2\pi - \Theta_{1,i} - \varepsilon_{1,i}$$

$$g_{i,1,2}(x_1, y_1, x_2, y_2, V_r) = \tag{J-1}$$
$$\frac{r_{x,1,i}}{|r_{1,i}|} \cdot \frac{(x_2 - x_1)}{(t_2 - t_1)} + \frac{r_{y,1,i}}{|r_{1,i}|} \cdot \frac{(y_2 - y_1)}{(t_2 - t_1)} - \left(v_{1,i} - V_{1,Ri} \cdot \frac{\lambda}{2\pi}\right) - \varepsilon_{3,1}$$

for the position and velocity of the tag 2 transmitting the chirp 5 at $t_1$ to an i-th receiver 3 and:

$$f_{1,i}(x_2, y_2, \Phi_T, V_{r,Ri}) = (N_1 - N_2)\frac{\omega}{2\pi \cdot c} \cdot |r_{2,i}(x_2, y_2)| + \tag{I-2}$$
$$\Phi_{Ri}(t_0) + (t_2 - t_0) \cdot V_{r,Ri} - C_{2,i} \cdot 2\pi - \Theta_{2,i} - \varepsilon_{2,i}$$

$$g_{i,2,1}(x_1, y_1, x_2, y_2, V_r) = \tag{J-2}$$
$$\frac{r_{x,2,i}}{|r_{2,i}|} \cdot \frac{(x_2 - x_1)}{(t_2 - t_1)} + \frac{r_{y,2,i}}{|r_{2,i}|} \cdot \frac{(y_2 - y_1)}{(t_2 - t_1)} - \left(v_{2,i} - V_{1,Ri} \cdot \frac{\lambda}{2\pi}\right) - \varepsilon_{4,1}$$

for the position and velocity of the tag 2 transmitting the chirp 5 at $t_2$ to an i-th receiver 3. For three fixed receivers 3 and two chirps 5, there is a system of 12 equations containing 12 measurements (three phase and three frequencies at each of the two points) and having 10 unknowns, namely $x_1$, $y_1$, $x_2$, $y_2$, $\Phi_{R1}(t_0)$, $\Phi_{R2}(t_0)$, $\Phi_{R3}(t_0)$, $\Delta V_{r,R1}$, $\Delta V_{r,R2}$, $\Delta V_{r,R3}$. Provided that the measurements are independent, the system of equations can be solved, using an appropriate numerical minimisation technique, to yield the positions of the tag 2 at times $t_1$ and $t_2$ and the phase and frequency offsets of each of the fixed receivers 3.

If the measurements of the mobile tag 2 are not at different times (i.e. if $t_1 = t_2$), then the equations set is singular and cannot be solved. Furthermore, if the time interval (i.e. $\Delta t = t_2 - t_1$) is too short (e.g. less than 1 second), then solution becomes sensitive to measurement errors. If, however, the time interval is too long (e.g. more than 60 seconds), then the clocks may not be sufficiently stable over the time interval and so pseudo-synchronisation is ineffective.

The technique of pseudo-synchronisation using a mobile tag 2 can be employed using more than two chirps 5 and/or using more than three receivers 3.

For example, using an additional chirp (transmitted at a time $t_3$) yields a further and six measurements and, thus, six additional equations, but only two additional unknowns, namely $x_3$, $y_3$. Thus, the surplus of equations and measurements over unknowns is six.

Likewise, using a fourth receiver yields four additional four further measurements and, thus, four additional equations (i.e. sixteen measurements and sixteen equations in total), but only two additional unknowns, namely phase and frequency offset for the fourth receiver. Thus, the surplus of equations and measurements over unknowns is four.

Using additional chirps 5 or additional receivers 3 yields increasingly over-determined equation sets (i.e. equation sets with more redundancy) which are potentially more stable, although additional computational power is usually needed to solve the set of equations.

Figure 22:
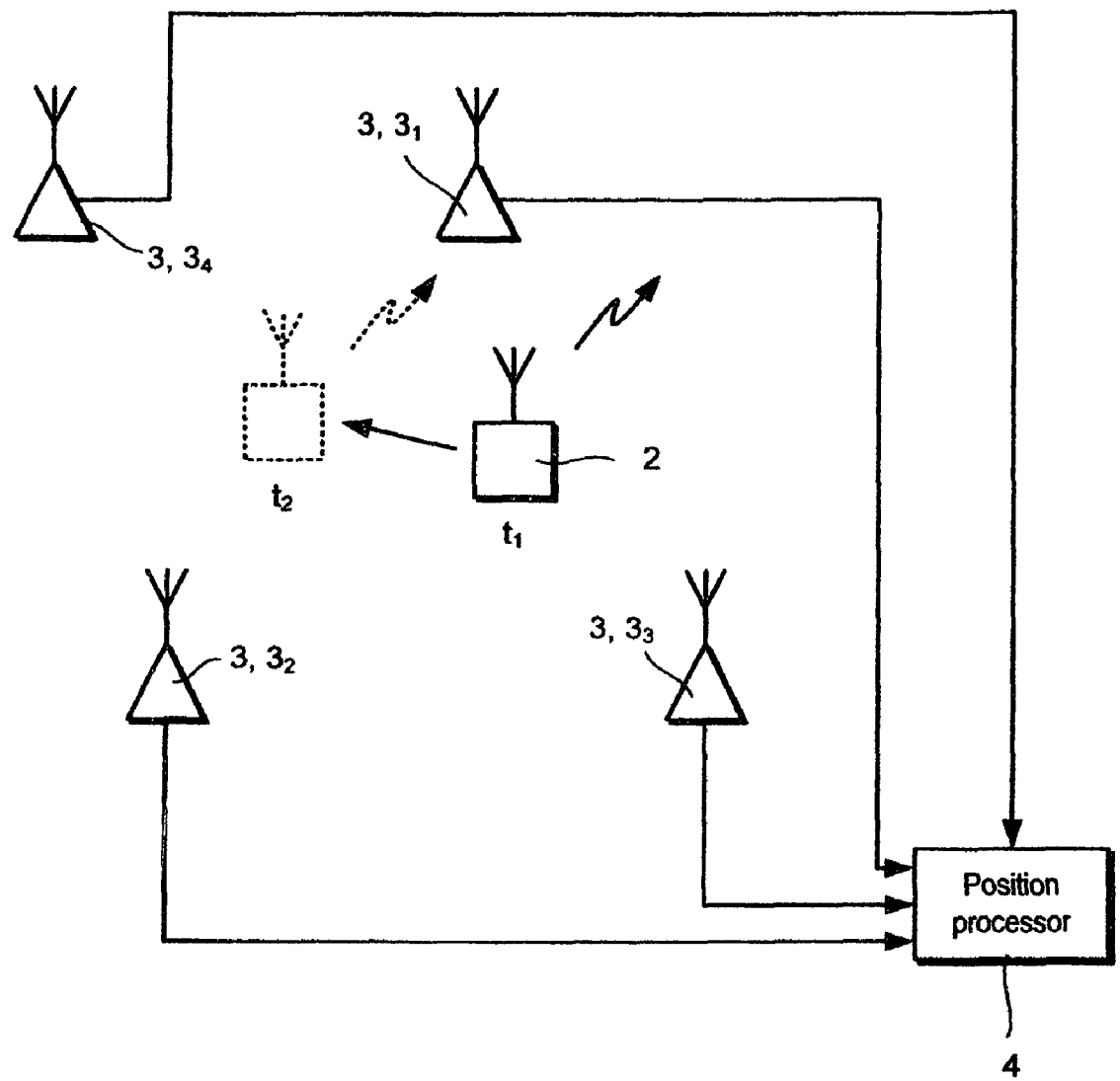
FIG. 22 illustrates use of a mobile tag for synchronisation.

The chirps 5 need not be received by the same receivers 3 to allow the tag 2 to pseudo-synchronise the receivers 3, as will now be explained with reference to FIG. 22.

A first chirp 5 may be received by second, third and fourth receivers $3_2$, $3_3$, $3_4$ and a second chirp 5 may be received by first, second and third receivers $3_1$, $3_2$, $3_3$.

The set of position and velocity equations (I) and (J) above include twelve equations containing twelve measurements, but there are twelve unknowns. Thus, the set of equations can still be solved.

For two chirps 5 and three receivers 3, if each chirp 5 is received by at least two receivers 3, then the set of equations (I) and (J) can be solved.

The number of unknowns is given by:

$$\text{unknown} = 2 \cdot n + 2 \cdot M \quad (U)$$

where n is the number of chirps 5 and M is the total number of different fixed receivers across the equation set.

The number of measurements and equations is given by:

$$\text{equations, measurements} = 2 \cdot n \cdot m \quad (V)$$

where m is the number of receivers receiving each of the chirps 5.

Thus, the condition for finding a unique solution can be given by the relationship:

$$n \cdot m \geq n + m + \delta \quad (W)$$

where δ is the number of receivers 3 receiving any one chirp 5 that do not also receive other chirps 5.

Using equation (W), the minimum number of chirps 5 and receivers 3 needed to find a solution to the set of equations (I) and (J) can be found.

Thus, for two chirps 5 and at least three receivers 3, if each chirp 5 is received by at least two receivers 3, then the set of equations can be solved.

For three chirps 5 and at least three receivers 3, even if none of the chirps 5 are received by the same receiver 5, then a set of equations can still be solved. However, for three receivers 3, the set of equations is not over-determined and, thus, may be susceptible to producing a poor solution if any of the measurements are noisy.

Using more than three chirps 5 and at least three receivers 3 yields an over-determined set of equations even if none of the chirps 5 are received by the same receiver 5.

Computational load rises as the number of equations increases. Thus, the number of chirps 5 and receivers 3 is usually limited. Typically, between three and seven chirps 5 and between four and twelve receivers 3 (in range) are used to solve a set of equations for position, velocity, phase offset and frequency offset.

Determining Position and Velocity in Three Dimensions

In the embodiments hereinbefore described, the position processor 4 determines the position of the tag 2 in only two dimensions. However, the position processor 4 can compute the position of the tag 2 in three dimensions using substantially the same process, although additional measurements may be required to compensate for additional unknowns, as will now be explained.

A three-dimensional range equation, $f_{j,i}(x_j, y_j, z_j, \Phi_T)$ for a phase measurement, $\Theta_{R,i}(j)$, at an i-th receiver 3 receiving a chirp 5 transmitted by the tag 2 at a j-th time is given by:

$$f_{j,i}(x_j, y_j, z_j, \Phi_T) = (N_1 - N_2) \frac{\omega}{2\pi \cdot c} \cdot |r_{j,i}(x_j, y_j, z_j)| + \quad (I')$$
$$\Phi_T(t_0) + (t_j - t_0) \cdot V_r - C_{j,i} \cdot 2\pi - \Theta_{j,i} - \varepsilon_{i,j},$$
$$= 0$$

where $|r_{j,i}(x_j, y_j, z_j)| = \sqrt{(x_j - X_i)^2 + (y_j - Y_i)^2 + (z_j - Z_i)^2}$, such that $(x_j, y_j, z_j)$ are the co-ordinates of the tag 2 at the j-th time, and where $\Phi_T(t_0)$ is a network phase at time $t_0$.

Likewise, a velocity equation, $g_{j,k,i}(x_j, y_j, z_j, x_k, y_k, z_k, V_r)$ for a pair of frequency measurements, $v_{j,i}$ and $v_{k,i}$, at an i-th receiver 3 receiving chirps 5 transmitted by the tag 2 at j-th and k-th times (where j≠k) is given by:

$$g_{j,k,i}(x_j, y_j, z_k, x_k, y_k, z_k, V_r) = \left(\frac{r_{x,j,i}}{|r_{j,i}|} + \frac{r_{x,k,i}}{|r_{k,i}|}\right) \cdot \frac{(x_k - x_j)}{(t_k - t_j)} + \quad (J')$$
$$\left(\frac{r_{y,j,i}}{|r_{j,i}|} + \frac{r_{y,k,i}}{|r_{k,i}|}\right) \cdot \frac{(y_k - y_j)}{(t_k - t_j)} +$$
$$\left(\frac{r_{z,j,i}}{|r_{j,i}|} + \frac{r_{z,k,i}}{|r_{k,i}|}\right) \cdot \frac{(z_k - z_j)}{(t_k - t_j)} -$$
$$v_{j,i} - v_{k,i} + 2 \cdot V_r \cdot \frac{\lambda}{2\pi} - \varepsilon_{i,j,k}$$
$$= 0$$

The function to be solved is $$P(x_j, y_j, z_j, x_k, y_k, x_k, \Phi_T, V_r) = f_{j,i}^2 + w_{j,k,i} \cdot g_{j,k,i}^2 \quad (K')$$

where k∈{j}, k≠j.

Minimising the function P yields a least squares estimation of the "best" solution to the equation set.

For three receivers 3, there are twelve measurements, twelve equations and eight unknowns. A solution can be found. However, three receivers 3 lie on a plane and so the solution tends to be sensitive to measurement errors which introduce large errors perpendicular to the plane (i.e. height). Thus, using three receivers 3 seldom yields a reliable solution.

For four receivers 3, there are sixteen measurements, sixteen equations and eight unknowns. Thus, using four or more receivers 3 can provide a better, more reliable solution.

One or more fixed tags 2' may be used to pseudo-synchronise the receivers 3 as described earlier. Additionally or alternatively, the tag 2 can be used. If the tag 2 is used, then a minimum of four receivers 3 and at least two chirps having at least three receivers 3 in common is required.

Using more than four receivers 3 and/or more than two chirps 5 to compute position and velocity helps to add redundancy and robustness, for the same reasons described earlier.

If the tag 2 is constrained to a surface, then the three-dimensional equations can be used with the position constrained to lie on the surface.

In a simple case, the surface may be a plane having a constant z value (i.e. height). Thus, the z components in the equations can be fixed and not generated as part of the solution.

This can be particularly useful for applications in which motion of the tag 2 is constrained to lie in a plane, but the receivers 3 are not located in the same plane. For example, the receivers 3 may be mounted above or below the plane.

If the surface is more complicated, for example it is not flat or does not have a constant z component across the tracking area, then it may be used as a solution constraint within the minimiser. There are different methods of applying such constraints within the minimisation function.

Using Fixed Transmitters and Mobile Receiver (Tag)

The examples hereinbefore described, the tag 2 is mobile and the receivers 3 are fixed. However, the roles may be reversed, as will now be explained in more detail.

Figure 23:
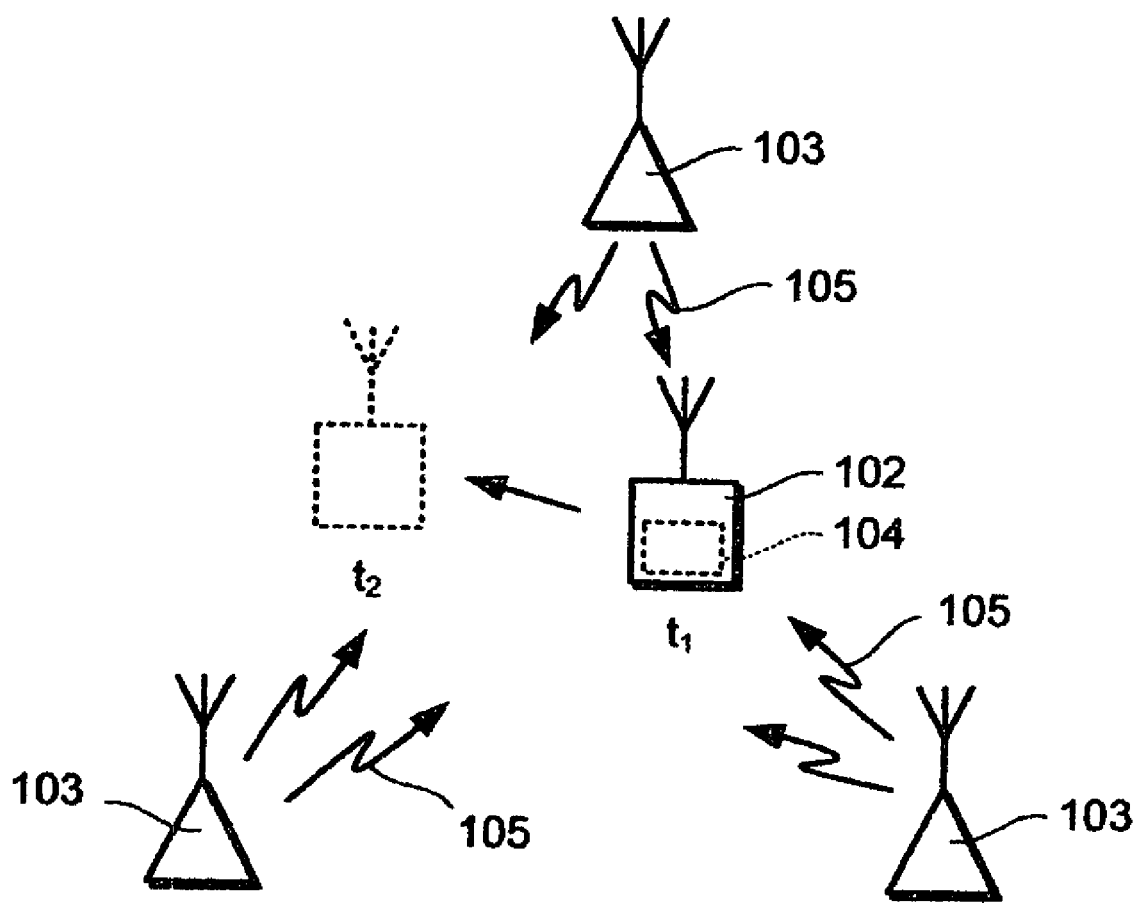
FIG. 23 is a schematic diagram of a system for determining a position of a tag according to some embodiments of the present invention in which chirps are transmitted by fixed receivers and received by a tag.

Referring to FIG. 23, another embodiment of a system 101 for determining position and velocity of a mobile tag 102 in accordance with the present invention is shown.

The system 101 includes first, second and third fixed transmitters 103. The tag 102 is a receiver and includes a position processor 104.

Each fixed transmitter 103 transmits respective first signals 105 at time $t_1$ which are received by the tag 102. The tag 102 processes each signal 105 and generates data for the position processor 104. At time $t_2$ (where $t_1 \neq t_2$), each fixed transmitter 103 transmits respective first signals 105 at time $t_2$ which are received by the tag 102. The tag 102 processes each signal 105 and generates data for the position processor 104. The position processor 104 calculates a position and a velocity of the tag 2.

The signals 105 are substantially the same as the signal 5 shown in FIG. 2. The tag 102 processes the received chirps 105 by extracting the phase and phase slope (i.e. frequency) in the same way as the position processor 4 described earlier. The position processor 104 operates substantially the same as the position processor 4 shown in FIG. 1.

Signal propagation between a transmitter and a receiver is commutative. Thus, the tag 102 is able to compute its position using the position and velocity equations described earlier.

A fixed tag (not shown) can be used for pseudo-synchronisation in a similar way to that described earlier. Thus, the fixed transmitters 103 also operate as receivers, measure signals transmitted by the fixed tag (not shown) and report the measurements to the tag 102 wirelessly. In other words, the fixed transmitters 103 also operate in the same way as the receivers 3 (FIG. 1) described earlier, by taking measurements and sending a message reporting those measurements to a position processor which, in this case, is located in the tag 2.

Notwithstanding this, a fixed tag need not be used. The tag 102 can derive synchronisation information by solving equation (A) and using pre-installed information about the positions and identities of the fixed transmitters 103.

More than three fixed transmitters 103 can be used.

The system 101 can be modified in other ways as described earlier. For example, the tag 102 can compute its position using more than two chirps 105. The chirps may comprise multiple tone differences which can be used to resolve cycle ambiguities and achieve higher positioning accuracy.

The transmitters 103 may be a wireless local area network (WLAN) access point which interleave chirps 105 with other signals (not shown) arising from the conventional operations of a WLAN access point. Likewise, the tag 102 can be a WLAN transceiver, which can also compute its position in real time using the chirps 105.

The tag 102 need not include the position processor 104. Instead, the tag 102 can transmit a message (not shown) to a remote position processor, in a similar way to the receivers 3 (FIG. 1) described earlier.

Determining Position and Velocity in Unstable Networks

In the examples described earlier, it is assumed that the time interval between chirps 5 is sufficiently short that the clocks of the receivers 3 are assumed to be stable other that time interval. However, the time interval may be sufficiently long that the assumption in no longer valid. Notwithstanding this, it is still possible to determine the position and velocity of the tag 2.

A measurement of a chirp 5 at an i-th receiver 3 transmitted by the tag 2 at a j-th time is considered to have an unknown phase offset $\Phi_T(t_j)$ and an unknown frequency offset $V_r(t_j)$ associated with it. Thus, equations (I) and (J) can be rewritten to take these into account, namely:

$$f_{j,i}(x_j, y_j, \Phi_T) = (N_1 - N_2)\frac{\omega}{2\pi \cdot c} \cdot |r_{j,i}(x_j, y_j)| + \quad (I'')$$
$$\Phi_T(t_j) + V_r - C_{j,i} \cdot 2\pi - \Theta_{j,i} - \varepsilon_{i,j}$$
$$= 0$$

and $$g_{j,k,i}(x_j, y_j, x_k, y_k, V_r) = \left(\frac{r_{x,j,i}}{|r_{j,i}|} + \frac{r_{x,k,i}}{|r_{k,i}|}\right) \cdot \frac{(x_k - x_j)}{(t_k - t_j)} + \quad (K'')$$
$$\left(\frac{r_{y,j,i}}{|r_{j,i}|} + \frac{r_{y,k,i}}{|r_{k,i}|}\right) \cdot \frac{(y_k - y_j)}{(t_k - t_j)} -$$
$$v_{j,i} - v_{k,i} + 2 \cdot V_r \cdot \frac{\lambda}{2\pi} - \varepsilon_{i,j,k}$$
$$= 0$$

Thus, for the system shown in FIG. 1, there are twelve measurements, twelve equations and eight unknowns and the set of equations can still be solved for the unknown positions, network phases and network velocities at the two positions.

However, as explained earlier, adding more receivers 3 or using more than two chirps 5 provide additional measurements and increases the robustness of the solution. Furthermore, phase and frequency offsets of the receivers 3 may also be determined using one or more fixed tags, as described previously.

A situation may arise in which the frequency offset of the receivers 3 remains constant over the time interval between chirps, but the phase offset changes. This might occur, for example, if the oscillator in the tag 2 is reset between chirps and does not maintain phase coherence. In that case, for the system shown in FIG. 1, there are seven unknowns.

Modifications

It will be appreciated that many modifications may be made to the embodiments herein before described.

The systems hereinbefore described may be used in horseracing to track not only horses and/or jockeys during a horse race, it can be used in other sports, such as football, motor racing, sailing, athletics and any similar "track and field" sport. The sport may be outdoor and indoor.

The systems may be used in professional and commercial applications, such as asset monitoring, personnel tracking for safety purposes and operational management. The system may be used to monitoring the whereabouts of farm or wild animals.

Frequency bands other than a 2.45 GHz licence-exempt frequency band can be used. For example, a 3.5 GHz, 5 GHz, 868 MHz or other frequency band may be used.

Frequency differences between tones other than those lying in the range from about 350 kHz to 10 MHz can be used. For example, larger and smaller frequency differences can be used.

A tone spacing other than 50.78125 kHz and an FFT length other than 512 points can be used. Different tone spacings and different FFT lengths can be used according to the requirements of the application. The length of the chirps can also be varied and greater or fewer tone differences used. Chirps can also be transmitted more or less frequently. Chirps may be transmitted continually to give position update rates of at least 2 kHz or even higher.

The tones in a chirp need not be transmitted sequentially, but can be transmitted concurrently.

The tones can be carriers of an orthogonal frequency division modulation (OFDM) signal. Thus, the methods herein before described can be used to position transmitters and receivers robustly and reliably in an OFDM network, such as a WiFi, cellular communication, broadcast radio or television network.

Although only one mobile tag has been described, it will be appreciated that the system can be used to track more than one tag. More than one tag can be deployed simultaneously and which share the same frequency band. For example, each tag may be configured to use a different set of tone frequencies. Each tag may be configured to transmit chirps at different time intervals. The tags may be configured to frequency hop in which successive chirps use different sets of frequencies and the intervals between chirps vary pseudo-randomly. These and other methods may be used in order to achieve efficient use of the available frequency band.

Tags need not be identified using an identifying tone. For example, tags may be identified using a tone pattern, an identification signature that modulates an initial tone, for example, using a short data burst. The data burst might carry additional information internal to the tag (such as battery status, tamper detection, etc.) and/or external to the tag (such as telemetry from the object being tracked).

The system can be integrated into other systems. For example, the tones can be integrated into signals transmitted by WLAN transceivers and access points conforming to IEEE 802.11. Thus, WLAN system would still function as a wireless communications network, but with added capability for high accuracy real-time positioning. In the case of conventional frequency hopped or DSSS systems, the tones can be tagged onto the transmission time. In the case of OFDM-based wireless network, the individual OFDM carriers can be the tones that are used to compute the position.

The invention claimed is:

1. A method, comprising:
   receiving a first phase difference between phases of two frequency components of a first signal transmitted by a tag at a first time and measured by a receiver;
   receiving a frequency offset between the tag and the receiver for the first signal;
   receiving a second phase difference between phases of two frequency components of a second signal transmitted by the tag at a second time and measured by the receiver; and
   determining a position of the tag in dependence upon the phase differences and the frequency offset.

2. The method of claim 1, further comprising
   receiving a second frequency offset between the tag and the receiver for the second signal; and
   determining a position of the tag in dependence upon the phase differences and the frequency offsets.

3. The method of claim 1, further comprising:
   receiving at least three phase differences for each of at least two signals transmitted by the tag, each signal comprising at least two frequency components and each of the at least three phase differences corresponding to phases measured by a different one of a plurality of receivers;
   receiving at least three frequency offsets for each of the at least two signals, each of the at least three frequency offsets measured by a different one of a plurality of receivers; and
   determining at least one position of the tag in dependence upon the phase differences and the frequency offsets.

4. The method of claim 3 wherein the at least two signals form a sequence of signals within a larger sequence of signals.

5. The method of claim 1 wherein the frequency offset is dependent upon a difference in frequencies of clocks in the tag and the receiver and upon a velocity of the tag at time of transmission of the signal.

6. The method of claim 1 further comprising providing a range equation dependent upon the phase differences.

7. The method of claim 6 wherein the tag has a first clock and the receiver has a second clock and wherein the range equation is also dependent upon a phase offset between the first clock in the tag and the second clock in the receiver.

8. The method of claim 6 wherein the tag has a first clock and the receiver has a second clock and wherein the range equation is dependent upon a frequency offset between the first clock in the tag and the second clock in the receiver.

9. The method of claim 6 wherein the range equation includes an error term and the equation is rearranged to equal zero.

10. The method of claim 6 wherein the tag has a first clock and the receiver has a second clock and wherein the range equation is dependent upon a phase offset between the first and second clocks and is further dependent upon a frequency offset between the first and second clocks, the method further comprising determining the velocity of the tag in dependence upon the phase difference and frequency offset.

11. The method of claim 5 further comprising providing a velocity equation dependent upon the frequency offset.

12. The method of claim 11 wherein the tag has a first clock and the receiver has a second clock and wherein the velocity equation is dependent upon a frequency difference between the first and second clocks.

13. The method of claim 11 wherein the velocity equation includes an error term and the equation is rearranged to equal zero.

14. The method of claim 1 further comprising determining a velocity of the tag in dependence upon the phase differences and the frequency offset.

15. The method of claim 1, further comprising:
   receiving a plurality of phase differences between phases of two frequency components of a plurality of signals transmitted by the tag and measured by a plurality of receivers;
   receiving a plurality of frequency offsets for the plurality of signals transmitted by the tag and measured by a plurality of receivers; and
   determining a plurality of positions of the tag in dependence upon the phase differences and the frequency offsets.

16. The method of claim 15, further comprising:
   preparing a first set of equations for at least one signal and a plurality of receivers, each equation of the first set being a function of position of the tag and a respective phase difference and including a respective residual error;
   preparing a second set of equations for at least two signals and a plurality of receivers, each equation of the second set being a function of position of the tag and a respective pair of frequency offsets and including a respective residual error; and
   solving the equations to obtain at least one position of the tag.

17. The method of claim 16, wherein solving the equations to obtain at least one position of the tag includes combining the equations to provide a cost function and to minimize cost.

18. The method of claim 17 wherein combining the equations further includes providing a respective weighting for each equation.

19. The method of claim 15, further comprising:
determining a first count of the equations;
determining a second count of unknowns in the equations; and
preparing further equations until the first count is equal to or greater than the second count.

20. The method of claim 19 further comprising preparing further equations until the first count exceeds the second count.

21. The method of claim 19 further comprising determining a count of equations needed in dependence upon the number of receivers and the number of signals measured by the receivers.

22. The method of claim 2 wherein the tag transmits signals at least two different frequency components at different times.

23. The method of claim 2 wherein the tag transmits signals having at least four different frequency components.

24. The method of claim 2, further comprising:
receiving a difference in respective phases of two different frequency components for a given signal from a fixed tag of known position and for the receiver;
obtaining frequency offsets between the fixed tag and the receiver for at least two different signals;
receiving a difference in respective phases of two different frequency components for a given signal from the fixed tag and for a second receiver;
obtaining frequency offsets between the fixed tag and the second receiver for at least two different signals;
determining a relative phase offset between the receivers; and
determining a relative frequency offset between the receivers.

25. The method of claim 2 comprising:
receiving a difference in respective phases of two different frequency components for a given signal from a first fixed tag of known position and for the receiver;
receiving a difference in respective phases of two different frequency components for a given signal from a second fixed tag of known position and for the receiver; and
determining a relative phase offset between the first and second fixed tags.

26. The method of claim 2 wherein the tag transmits signals having at least three different frequency components, such that at least two different phase differences are obtainable corresponding to different pairs of frequency components, the method comprising:
determining a first estimate of position of the tag in dependence upon the difference between respective phases of a first pair of frequency components; and
determining a second estimate of position of the tag in dependence upon the difference between respective phases of a second pair of frequency components.

27. The method of claim 1 wherein determining the position of the tag includes limiting the position of the tag to a predefined surface.

28. A method, comprising:
receiving a phase difference between phases of two frequency components of a first signal transmitted by a transmitter at a first time and measured by a tag;
receiving a frequency offset between the tag and the transmitter for the first signal;
receiving a phase difference between phases of two frequency components of a second signal transmitted by a transmitter at a second, different time and measured by the tag; and
determining the position of the tag in dependence upon the phase differences and the frequency offset.

29. The method of claim 28, comprising:
receiving a phase difference for each signal of at least three sets of signals, each signal comprising at least two frequency components, each set of signals transmitted by a different transmitter and each set comprising at least two signals;
receiving frequency offset for each signal of the at least three sets of signals; and
determining at least one position of the tag in dependence upon the phase differences and the frequency offsets.

30. A computer readable medium which stores instructions which are executable on a computer in which the instructions perform a method for determining the position of a tag, the method comprising:
receiving a first phase difference between phases of two frequency components of a first signal transmitted by the tag at a first time and measured by a receiver;
receiving a frequency offset between the tag and the receiver for the first signal;
receiving a second phase difference between phases of two frequency components of a second signal transmitted by the tag at a second time and measured by the receiver; and
determining a position of the tag in dependence upon the phase differences and the frequency offset.

31. The computer readable medium of claim 30 wherein the method further comprises:
receiving at least three phase differences for each of at least two signals
transmitted by the tag, each signal comprising at least two frequency components
and each of the at least three phase differences corresponding to phases measured by a different one of a plurality of receivers;
receiving at least three frequency offsets for each of the at least two signals, each of the at least three frequency offsets measured by a different one of a plurality of receivers; and
determining at least one position of the tag in dependence upon the phase differences and the frequency offsets.

32. An apparatus, comprising:
means for receiving a first phase difference between phases of two frequency components of a first signal transmitted by a tag at a first time and measured by a receiver;
means for receiving a frequency offset between the tag and the receiver for the first signal;
means for receiving a phase difference between phases of two frequency components of a second signal transmitted by the tag at a second, different time and measured by the receiver; and
means for determining a position of the tag in dependence upon the phase differences and the frequency offset.

33. The apparatus of claim 32, wherein:
the phase difference receiving means is operable to receive at least three phase differences for each of at least two signals transmitted by the tag, each of the at least two signals
having at least two frequency components and each of the at least three phase differences corresponding to phases measured by a different one of a plurality of receivers;

the frequency offset receiving means is operable to receive at least three frequency offsets for each of the at least two signals, each of the at least frequency offsets measured by a different one of the plurality of receivers; and the position determining means is operable to determine at least one position of the tag in dependence upon the phase differences and the frequency offsets.

34. A system, comprising:

a buffer arranged to receive a first phase difference between phases of two frequency components of a first signal transmitted by a tag at a first time and measured by a receiver, a frequency offset between the tag and the receiver for the first signal, a second phase difference between phases of two frequency components of a second signal transmitted by the tag at a second, different time and measured by a receiver; and a position determination unit to determine the position of the tag in dependence upon the phase difference and the frequency offset.

35. The system of claim 34, further comprising:

at least three receivers, each receiver operable, in response to receiving a signal, to measure respective phases of the first and second frequency components and to measure a frequency offset between the tag and each receiver, the frequency offset dependent upon a difference in frequencies of respective clocks in the tag and the receivers and to transmit the phases and the frequency offset to the position determination unit.

* * * * *